US012537318B2

(12) United States Patent
Neenan et al.

(10) Patent No.: US 12,537,318 B2
(45) Date of Patent: Jan. 27, 2026

(54) ANTENNA SYSTEMS

(71) Applicant: Parsec Technologies, Inc., Plano, TX (US)

(72) Inventors: Michael A. Neenan, Plano, TX (US); Richard Loy Smith, Jr., Dallas, TX (US); George Alexander Bednekoff, Plano, TX (US); Rauhon Ahmed Shaik, Wylie, TX (US)

(73) Assignee: Parsec Technologies, Inc., Plano, TX (US)

( * ) Notice: Subject to any disclaimer, the term of this patent is extended or adjusted under 35 U.S.C. 154(b) by 183 days.

(21) Appl. No.: 18/447,176

(22) Filed: Aug. 9, 2023

(65) Prior Publication Data

US 2024/0113450 A1 Apr. 4, 2024

Related U.S. Application Data

(60) Provisional application No. 63/371,069, filed on Aug. 10, 2022.

(51) Int. Cl.
*H01Q 21/28* (2006.01)
*H01Q 5/314* (2015.01)
(Continued)

(52) U.S. Cl.
CPC ............ *H01Q 21/28* (2013.01); *H01Q 5/314* (2015.01); *H01Q 7/00* (2013.01); *H01Q 9/42* (2013.01); *H01Q 1/241* (2013.01)

(58) Field of Classification Search
CPC .......... H01Q 1/241; H01Q 1/246; H01Q 1/32; H01Q 1/48; H01Q 5/00; H01Q 5/48;
(Continued)

(56) References Cited

U.S. PATENT DOCUMENTS 5,966,102 A 10/1999 Runyon
6,111,550 A 8/2000 Miller et al.
(Continued)

FOREIGN PATENT DOCUMENTS

CN 102097674 6/2011
CN 102468529 5/2012
(Continued)

OTHER PUBLICATIONS

Balling et al., "Broadband Dual Polarized Antenna Arrays for Mobile Communication Applications", 33rd European Microwave Conference Proceedings IEEE, Oct. 7, 2003, Munich, Germany, p. 1-4.
(Continued)

*Primary Examiner* — Hoang V Nguyen
(74) *Attorney, Agent, or Firm* — Knobbe Martens Olson & Bear LLP

(57) ABSTRACT

An antenna assembly can include a cover and a base configured to be removably coupled to the cover. The antenna assembly can include one or more of: a UHF radiator portion, a VHF radiator portion, one or more multi-band radiator portions, one or more dual-band WiFi radiator portions, a GPS antenna, and a loop antenna portion positioned between the cover and the base. The loop antenna can be suspended below the UHF and VHF radiator portion and above the multi-band and dual-band WiFi radiator portions, and can be configured for AM and FM radiofrequency signals. The antenna assembly can be used for broadcast television reception and multi-band wireless telecommunications. The antenna assembly can have a compact aerodynamic profile. The UHF radiator portion and VHF radiator portion can be formed on separate flex-circuits that can be coupled to internal ribs in the cover.

20 Claims, 17 Drawing Sheets

(51) Int. Cl.
*H01Q 7/00* (2006.01)
*H01Q 9/42* (2006.01)
*H01Q 1/24* (2006.01)

(58) Field of Classification Search
CPC ........ H01Q 5/314; H01Q 7/00; H01Q 21/062; H01Q 21/24; H01Q 21/26; H01Q 21/28; H01Q 21/30; H01Q 25/001
See application file for complete search history.

(56) References Cited

U.S. PATENT DOCUMENTS

| | | | |
|---|---|---|---|
| 9,379,453 B2 | | 6/2016 | Rentz |
| 10,224,615 B2 | | 3/2019 | Wu |
| 11,251,539 B2 | | 2/2022 | Hinman |
| 11,283,149 B2 | | 3/2022 | Neenan et al. |
| 11,329,363 B1 | * | 5/2022 | Neenan .................. H01Q 21/28 |
| 11,658,382 B2 | | 5/2023 | Neenan et al. |
| 11,664,574 B2 | | 5/2023 | Neenan et al. |
| 12,212,035 B2 | | 1/2025 | Neenan et al. |
| 12,266,845 B2 | | 4/2025 | Neenan et al. |
| 2010/0253584 A1 | | 10/2010 | Yang et al. |
| 2011/0080323 A1 | | 4/2011 | Thiam |
| 2011/0102278 A1 | | 5/2011 | Rozan |
| 2012/0146872 A1 | | 6/2012 | Chainon et al. |
| 2014/0139387 A1 | | 5/2014 | Jones et al. |
| 2014/0375507 A1 | | 12/2014 | Lin et al. |
| 2015/0042521 A1 | | 2/2015 | Hazen |
| 2015/0102974 A1 | | 4/2015 | Stoytchev et al. |
| 2016/0172750 A1 | | 6/2016 | Ng |
| 2016/0248148 A1 | | 8/2016 | Hill et al. |
| 2016/0277062 A1 | | 9/2016 | Cheon et al. |
| 2016/0285161 A1 | | 9/2016 | Apaydin et al. |
| 2017/0237158 A1 | | 8/2017 | Gibson et al. |
| 2017/0317428 A1 | | 11/2017 | Petropoulos |
| 2017/0324171 A1 | | 11/2017 | Shehan |
| 2018/0062731 A1 | | 3/2018 | Ng et al. |
| 2018/0083348 A1 | | 3/2018 | Thiam et al. |
| 2018/0109006 A1 | | 4/2018 | Ng et al. |
| 2018/0323513 A1 | | 11/2018 | Varnoosfaderani et al. |
| 2019/0148825 A1 | | 5/2019 | Huerta et al. |
| 2019/0237850 A1 | | 8/2019 | Fleischer et al. |
| 2019/0305406 A1 | | 10/2019 | Williams |
| 2019/0341674 A1 | | 11/2019 | Rosenthal et al. |
| 2019/0356051 A1 | | 11/2019 | Barrera et al. |
| 2020/0112101 A1 | | 4/2020 | Yun |
| 2020/0350664 A1 | | 11/2020 | Thill |
| 2020/0411972 A1 | | 12/2020 | Hicks et al. |
| 2021/0391655 A1 | | 12/2021 | Brobston et al. |
| 2022/0384966 A1 | | 12/2022 | Chiang et al. |
| 2023/0055367 A1 | | 2/2023 | Neenan et al. |
| 2023/0145053 A1 | | 5/2023 | Kilbury et al. |
| 2023/0223709 A1 | | 7/2023 | Guntupalli |
| 2023/0402732 A1 | | 12/2023 | Neenan et al. |
| 2023/0402733 A1 | | 12/2023 | Neenan et al. |
| 2024/0097339 A1 | | 3/2024 | Khatua |
| 2024/0113451 A1 | | 4/2024 | Neenan et al. |
| 2024/0128644 A1 | | 4/2024 | Neenan et al. |
| 2024/0304958 A1 | | 9/2024 | Matsumura |
| 2024/0347892 A1 | | 10/2024 | Neenan et al. |
| 2025/0079683 A1 | | 3/2025 | Neenan et al. |
| 2025/0079704 A1 | | 3/2025 | Neenan et al. |
| 2025/0158289 A1 | | 5/2025 | Neenan et al. |
| 2025/0167459 A1 | | 5/2025 | Neenan et al. |
| 2025/0233306 A1 | | 7/2025 | Neenan et al. |

FOREIGN PATENT DOCUMENTS

| | | | | |
|---|---|---|---|---|
| CN | 203562507 | | 4/2014 | |
| CN | 105281049 | | 1/2016 | |
| CN | 105281049 B | * | 10/2017 | ............. H01Q 21/30 |
| CN | 210806018 | | 6/2020 | |
| CN | 212303910 | | 1/2021 | |
| CN | 114465021 | | 5/2022 | |
| CN | 116151285 | | 5/2023 | |
| DE | 202017002307 U1 | | 8/2017 | |
| EP | 0 349 499 | | 1/1990 | |
| EP | 3 474 376 | | 4/2019 | |
| EP | 3 614 491 | | 2/2020 | |
| KR | 102260880 | | 6/2021 | |
| WO | WO 2005/062422 | | 7/2005 | |
| WO | WO-2013090783 A1 | * | 6/2013 | ............... H01Q 1/27 |
| WO | WO 2018/140305 | | 8/2018 | |
| WO | WO 2020/010039 | | 1/2020 | |
| WO | WO 2023/128683 | | 7/2023 | |
| WO | WO 2024/035801 | | 2/2024 | |
| WO | WO 2024/035805 | | 2/2024 | |
| WO | WO 2024/035810 | | 2/2024 | |

OTHER PUBLICATIONS

International Search Report and Written Opinion issued in PCT Application No. PCT/US2023/029885, dated Sep. 21, 2023, in 10 pages.

* cited by examiner

ANTENNA SYSTEMS

INCORPORATION BY REFERENCE TO ANY PRIORITY APPLICATIONS

The present application claim priority benefit to U.S. Provisional Application No. 63/371,069, filed Aug. 10, 2022, entitled "ANTENNA SYSTEMS", which is hereby incorporated herein by reference in its entirety. Any and all applications for which a foreign or domestic priority claim is identified in the Application Data Sheet as filed with the present application are hereby incorporated by reference under 37 CFR 1.57 and made a part of this specification.

BACKGROUND

Field

The present disclosure relates to the field of wireless broadband communication, and more particularly to antenna systems and antennas that cover multiple frequency bands used in the telecommunication wireless spectrum.

Description of the Related Art

Over the last few decades, Long Term Evolution (LTE) has become a standard in wireless data communications technology. Wireless communication relies on a variety of radio components including radio antennas that are used for transmitting and receiving information via electromagnetic waves. To communicate to specific devices without interference from other devices, radio transceivers and receivers communicate within a dedicated frequency bandwidth and have associated antennae that are configured to electromagnetically resonate at frequencies within the dedicated bandwidth. As more wireless devices are used on a frequency bandwidth, a communication bottleneck occurs as wireless devices compete for frequency channels within a dedicated bandwidth. LTE frequency bands range from 450 MHz to 6 GHz, however, antennas configured to resonate within this spectrum only resonate within a portion of the full LTE spectrum. To capture a greater portion of the LTE spectrum, either an antenna array of various antenna configurations is used, or a single geometrically complex antenna can be used. An antenna array, in most instances, takes up too much space and is therefore impractical for small devices, but employing a single antenna will have a useable bandwidth that is limited by its geometrical configuration. In one example, a known antenna configuration permits a 700 MHz-2.7 GHz frequency band; however, a single antenna configuration that permits a wider frequency band is desired. Additionally, it can be difficult and expensive to manufacture, assemble, and procure materials for components of antenna array systems and which can result in systems with poor functionality and/or coverage.

SUMMARY

This disclosure relates to antennas that cover the upper VHF band and the UHF band for broadcast television reception. The demand for broadcast television reception on mobile platforms has expanded with the increasing nomadic nature of the population. Satellite based reception requires precise pointing of the dish antenna. Common log periodic antennas are large and require orientation towards the broadcast tower. Streaming of video content over telecommunication networks is limited to areas that have sufficient coverage of high-speed data capabilities. As such, a low profile nearly omni-directional antenna for the reception of broadcast television that also encloses multi-element multi-band antennas for telecommunication bands is novel to the marketplace.

According to some embodiments, a dual-band omni-directional antenna for broadcast television reception and for multi-band wireless telecommunication marketplace has a two feed points, a ground reference, a grounding length, a first portion for low band operation, a second portion for low band operation, and one or more portions for high band operation. The ground reference of the feed point for the multi-band antenna is connected to a separate object that may provide a base for the multi-band antenna. The feed point of the multi-band antenna may be spaced above the base and have a space between the feed point and a location for the ground point. The ground connection has one of more portions before reaching a ground reference some distance away from the feed point. The low band portion has multiple resonances that are often odd multiples of the lowest resonant response. The portions that resonant most dominantly in the high band most often have multiple resonances that are even multiples of the lowest high band resonance. The multi-band antenna preferably has enough resonances spaced closely enough to appear to be a wide band antenna above the fundamental high band resonance. According to some embodiments, a multi-band antenna comprises a UHF element portion, a VHF radiator portion, one or more multi-band radiator portions, and one or more dual-band WiFi radiator portions.

According to some embodiments, an antenna assembly can include a cover and a base configured to be removably coupled to the cover. The antenna assembly can include one or more of: a UHF radiator portion, a VHF radiator portion, one or more multi-band radiator portions, one or more dual-band WiFi radiator portions, a GPS antenna, and a loop antenna portion positioned between the cover and the base. The loop antenna can be suspended below the UHF and VHF radiator portion and above the multi-band and dual-band WiFi radiator portions, and can be configured for AM and FM radiofrequency signals. The antenna assembly can be used for broadcast television reception and multi-band wireless telecommunications. The antenna assembly can have a compact aerodynamic profile. The UHF radiator portion and VHF radiator portion can be formed on separate flex-circuits that can be coupled to internal ribs in the cover.

Some advantageous features have thus been outlined in order that the more detailed description that follows may be better understood and to ensure that the present contribution to the art is appreciated. Additional features will be described hereinafter and will form the subject matter of the claims that follow.

Many objects of the present application will appear from the following description and appended claims, reference being made to the accompanying drawings forming a part of this specification wherein like reference characters designate corresponding parts in the several views.

Before explaining at least one embodiment of the present disclosure in detail, it is to be understood that the embodiments are not limited in its application to the details of construction and the arrangements of the components set forth in the following description or illustrated in the drawings. The embodiments are capable of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the various purposes of the present design. Accordingly, the claims should be regarded as including such equivalent constructions in so far as they do not depart from the spirit and scope of the present application.

BRIEF DESCRIPTION OF THE DRAWINGS

The novel features believed characteristic of the application are set forth in the appended claims. However, the application itself, as well as a preferred mode of use, and further objectives and advantages thereof, will best be understood by reference to the following detailed description when read in conjunction with the accompanying drawings, wherein:

Figure 1:
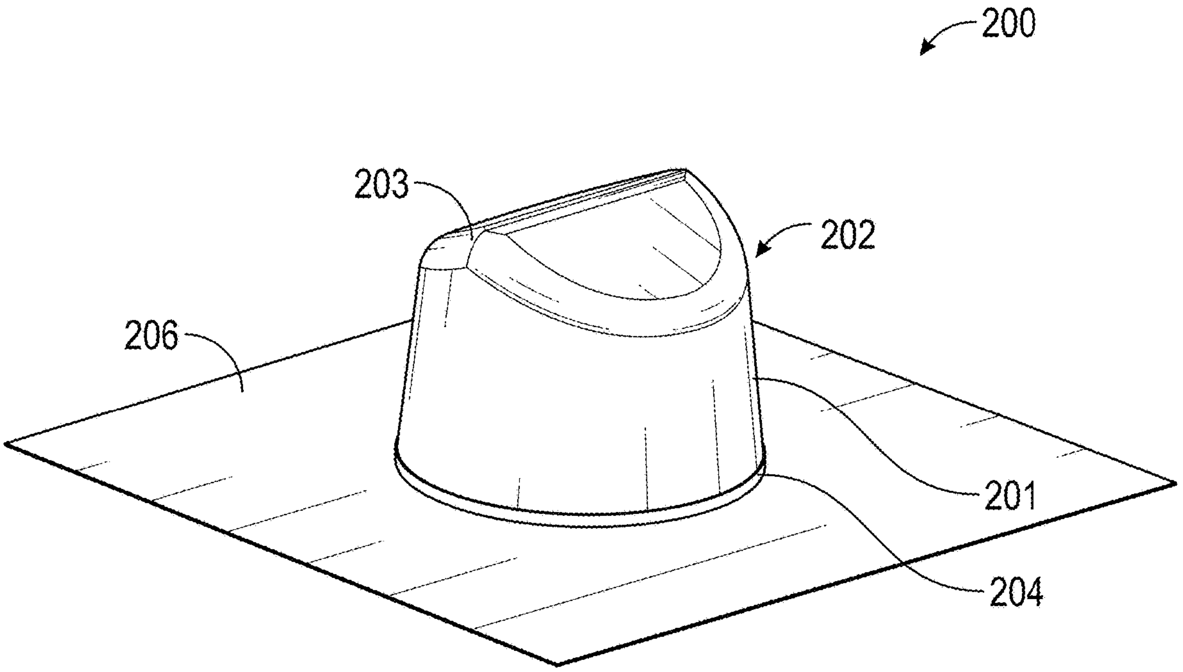
FIG. 1 illustrates a perspective view of an antenna assembly, in accordance with some aspects of this disclosure.

While the embodiments and method of the present application is susceptible to various modifications and alternative forms, specific embodiments thereof have been shown by way of example in the drawings and are herein described in detail. It should be understood, however, that the description herein of specific embodiments is not intended to limit the application to the particular embodiment disclosed, but on the contrary, the intention is to cover all modifications, equivalents, and alternatives falling within the spirit and scope of the process of the present application as defined by the appended claims.

DETAILED DESCRIPTION

Illustrative implementations of the preferred implementation are described below. In the interest of clarity, not all features of an actual implementation are described in this specification. It will of course be appreciated that in the development of any such actual implementation, numerous implementation-specific decisions must be made to achieve the developer's specific goals, such as compliance with system-related and business-related constraints, which will vary from one implementation to another. Moreover, it will be appreciated that such a development effort might be complex and time-consuming but would nevertheless be a routine undertaking for those of ordinary skill in the art having the benefit of this disclosure.

In the specification, reference may be made to the spatial relationships between various components and to the spatial orientation of various aspects of components as the devices are depicted in the attached drawings. However, as will be recognized by those skilled in the art after a complete reading of the present application, the devices, members, apparatuses, etc. described herein may be positioned in any desired orientation. Thus, the use of terms to describe a spatial relationship between various components or to describe the spatial orientation of aspects of such components should be understood to describe a relative relationship between the components or a spatial orientation of aspects of such components, respectively, as the implementations described herein may be oriented in any desired direction.

The system and method in accordance with the present disclosure overcomes problems commonly associated with traditional antenna systems. In particular, the system of the present application discloses an antenna system having a cover; a base configured to be removably coupled to the cover; a UHF radiator portion; a VHF radiator portion; one or more multi-band radiator portions; and one or more dual-band WiFi radiator portions, wherein the UHF radiator portion, the VHF radiator portion, the one or more multi-band radiator portions, and the one or more dual-band WiFi radiator portions are positioned between the cover and the base. These and other unique features of the system are discussed below and illustrated in the accompanying drawings.

The system and method will be understood, both as to its structure and operation, from the accompanying drawings, taken in conjunction with the accompanying description. Several implementations of the system may be presented herein. It should be understood that various components, parts, and features of the different implementations may be combined together and/or interchanged with one another, all of which are within the scope of the present application, even though not all variations and particular implementations are shown in the drawings. It should also be understood that the mixing and matching of features, elements, and/or functions between various implementations is expressly contemplated herein so that one of ordinary skill in the art would appreciate from this disclosure that the features, elements, and/or functions of one implementation may be incorporated into another implementation as appropriate, unless otherwise described. As used herein, "system" and "assembly" are used interchangeably. It should be noted that the articles "a", "an", and "the", as used in this specification, include plural referents unless the content clearly dictates otherwise. Dimensions provided herein provide for an exemplary implementation, however, alternate implementations having scaled and proportional dimensions of the presented exemplary implementation are also considered. Additional features and functions are illustrated and discussed below.

Referring now to the drawings wherein like reference characters identify corresponding or similar elements in form and function throughout the several views. FIGS. 1-5 illustrate top perspective views, isolated and/or highlighted views, and partial views of an antenna assembly, showing the system with and without being enveloped by a non-conductive cover. FIGS. 6A-6K illustrate various views of components of a multi-band radiator portion of the antenna assembly of FIG. 1, in accordance with some aspects of this disclosure.

According to some embodiments, features and aspects of this disclosure, a dual-band omni-directional antenna system can be used in conjunction with high order electromagnetic modes generated or received by a transceiver and/or receiver. According to some implementations, a dual-band omni-directional antenna system for broadcast television reception and for multi-band wireless telecommunication marketplace has a two feed points, a ground reference, a grounding length, a first portion for low band operation, a second portion for low band operation, and one or more portions for high band operation. The ground reference of the feed point for the multi-band antenna is connected to a separate object that may provide a base for the multi-band antenna. The feed point of the multi-band antenna may be spaced above the base and have a space between the feed point and a location for the ground point. The ground connection has one of more portions before reaching a ground reference some distance away from the feed point. The low band portion has multiple resonances that are often odd multiples of the lowest resonant response. The portions that resonant most dominantly in the high band most often have multiple resonances that are even multiples of the lowest high band resonance. The multi-band antenna preferably has enough resonances spaced closely enough to appear to be a wide band antenna above the fundamental high band resonance. According to some implementations, a multi-band antenna comprises a UHF element portion, a VHF radiator portion, one or more multi-band radiator portions, and one or more dual-band WiFi radiator portions.

The following detailed description of certain implementations presents various descriptions of specific implementations. However, the innovations described herein can be embodied in a multitude of different ways, for example, as defined and covered by the claims. In this description, reference is made to the drawings where like reference numerals can indicate identical or functionally similar elements. It will be understood that elements illustrated in the figures are not necessarily drawn to scale. Moreover, it will be understood that certain implementations can include more elements than illustrated in a drawing and/or a subset of the elements illustrated in a drawing. Further, some implementations can incorporate any suitable combination of features from two or more drawings.

Objects that are coupled together can be permanently connected together or releasably connected together. Objects that are permanently connected together can be formed out of one sheet of material or multiple sheets of material. The type of connection can provide different means for the realization of particular advantages and/or convenience consistent with the suitable function and performance of the device.

With reference to FIG. 1, a top perspective view of a multi-element dual-band omni-directional antenna 200 (referred to herein as the antenna assembly 200) is illustrated in accordance with an implementation of the present disclosure. The antenna assembly 200 can be used for any type of multi-band radio frequency transmission and reception of horizontally polarized communication. In one example, the antenna assembly 200 can be used for terrestrial broadcast television reception. In another example, the antenna assembly 200 can be used for multi-band wireless telecommunications. The antenna assembly 200 can include a cover 202 and a base 204. As shown in FIG. 1, the antenna assembly 200 can be mounted on a client ground plane 206. For ease of reference, a consistent coordinate system (X, Y, and Z) is included in the majority of the Figures herein, either outside of the drawings or embedded within the drawings. In some implementations, the antenna assembly 200 can have an IP67 rating. The antenna assembly 200 can be used for one or more of: television, cellular, WiFi, Bluetooth, GPS, and/or AM-FM radio. In some implementations, the antenna assembly 200 can have a diameter of approximately eight inches or less. In some implementations, the antenna assembly 200 can have a height of approximately ten and half inches or less.

The cover or radome 202 can protect and/or provide mechanical support for the internal components of the antenna assembly 200. For example, as explained with reference to FIGS. 7A and 7B, the cover 202 can include internal ribbing to support the UHF radiator portion 210 and the VHF radiator portion 240 of the antenna assembly 200. The cover 202 may be transparent to radiation from the internal antenna components of the antenna assembly 200. As such, the cover 202 may serve as an environmental shield for the internal components of the 200. The cover 202 may be made of a non-conductive material. The cover 202 may include a lower portion 201 and an upper portion 203. The lower portion 201 can be substantially cylindrical shaped with an open bottom. The upper portion 203 can be a dual-sloped top portion. For example, the cover 202 can have a maximum height along a centerline of the upper portion 203 that defines each slope of the upper portion 203. Other suitable shapes can be used for the cover 202. The 202 can be configured to be removably coupled to the base 204. In some cases, the shape of the cover 202 can be selected based on the expected operating conditions for the antenna assembly 200. For example, the expected wind-load on the antenna assembly 200 when in use (e.g., when mounted to a vehicle) can impact the design of the cover 202. In the illustrated example, the cover 202 is designed to minimize the amount of drag provided by the antenna assembly 200 when in use, while still providing enough room for the internal antenna components described herein. For example, the substantially cylindrical lower portion 201 can provide the antenna assembly 200 with a lower aerodynamic profile compared to an antenna assembly with a square shaped cover. Similarly, the dual-sloped upper portion 203 can provide the antenna assembly 200 with a low aerodynamic profile, particularly when the antenna assembly 200 is positioned in its operating condition such that the centerline of the upper portion 203 is perpendicular to the wind. For example, the centerline of the upper portion 203 can be aligned with the centerline of a vehicle to reduce the amount of drag provided by the antenna assembly 200.

The base 204 forms the base of the antenna assembly 200. As described herein, the base 204 can be the internal ground plane for the antenna assembly 200. The base 204 provides mechanical support for the internal components of the antenna assembly 200. The base 204 can be electrically conductive (e.g., be made of a conductive material such as a metal), although this is not required. Having a conductive base 204 for the antenna assembly 200 may provide certain advantages. For example, a conductive base 204 can serve as a ground plane for the antenna assembly 200. The base 204 can be generally the same shape as the bottom portion of the cover 202. In the illustrated example, the base 204 has a circular shape. In other implementations, other shapes are possible. In some implementations, the base 204 includes a plurality of small gaps (not shown) in the surface of the base 204, which may facilitate the use of non-conductive weather resistant material. In some implementations, the size and proximity of the base 204 may be selected to provide an electromagnetic connection between the client ground plane 106 and the base 204 when operating as the internal ground plane. The combination of at least the non-conductive cover 202 and the conductive base 204 provide mechanical and environmental protection for the internal components of the antenna assembly 200 as well as grounding for the electrically active, radiating, portions internal to the antenna assembly 200. In some implementations, the base 204 can include magnets positioned within the base 204 to allow the antenna assembly 200 to be magnetically coupled to external surfaces.

As shown in FIG. 1, the cover 202 can be positioned on the base 204 to secure the internal components of the antenna assembly 200. The cover 202 may include a plurality of fastener holes which may extend up the side walls of the cover 202. In some implementations, the fastener holes may be tapered. In some implementations, the fastener holes may be threaded. These plurality of fastener holes may be aligned with fastener holes of the base 204 in the assembled configuration, and fasteners can be positioned within the holes to secure the cover 202 and the internal components of antenna assembly 200 to the base 204.

The client ground plane 206 may be in the form of conducting surfaces the antenna assembly 200 can be mounted to. For example, the client ground plane 106 can be the roof of a vehicle (e.g., a car, a truck, a van, a motor home, and/or the like), buildings, indoor or outdoor equipment enclosures, and other such customer equipment that is conductive. Those skilled in the art would understand that the nature of the deployment of such the antenna assembly 200 will change slightly in the deployed performance based on type of structure the antenna assembly 200 is attached to as well as the surroundings in which it is deployed. Those skilled in the art realize that the lower frequency bands of antenna assembly 200 may work best when placed on a ground plane, such as the client ground plane 206, but that a ground plane is not required for applications where a reduction in the level of performance of the antenna assembly 200 is acceptable. Accordingly, in some implementations, the client ground plane 206 is not required and does not form a portion of the antenna assembly 200.

FIGS. 2-5 illustrate top perspective views of the antenna assembly 200 of FIG. 1 with the cover 202 removed and the majority of the base 204 not shown to further illustrate the internal components of the antenna assembly 200. Each of FIGS. 2-5 highlights one or more different components of the antenna assembly 200. The antenna assembly 200 can include one or more of: an ultra-high frequency ("UHF") radiator portion 210, a very-high frequency ("VHF") radiator portion 240, one or more multi-band radiator portions 100, one or more dual-band WiFi radiator portions 260, an AM-FM radiator portion 262, and a GPS radiating portion 264. In some implementations, any of the antenna components of the antenna assembly 200 can be removed, depending on the desired specification of the antenna assembly 200.

Figure 2:
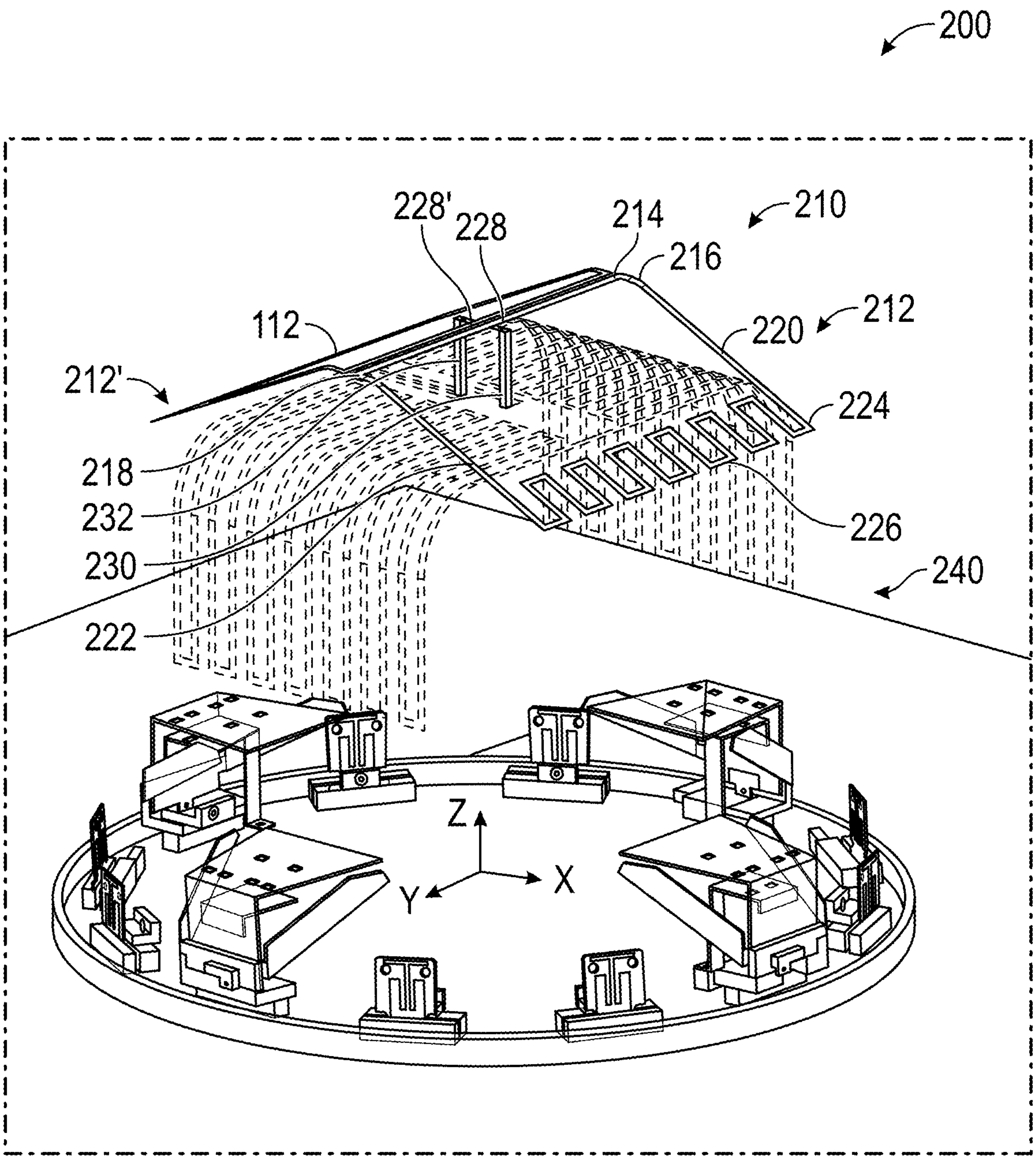
FIG. 2 illustrates a perspective view of the antenna assembly of FIG. 1 with the cover removed and highlighting a UHF radiator portion, in accordance with some aspects of this disclosure.

With reference to FIG. 2, the UHF radiator portion 210 is shown. The UHF radiator portion 210 can be a two-arm dipole that is bent and has a serpentine arm arrangement for the UHF band. The UHF radiator portion 210 can be conductive material (e.g., copper) etched into the structure of a PCB portion. For example, as shown more clearly in FIG. 5, the UHF radiator portion 210 can be formed on a UHF PCB portion 270. The UHF radiator portion 210 can be configured for operation in the ultra-high frequency range (e.g., between 300 MHz and 3 GHz). In FIG. 2, the VHF radiator portion 240 is shown in dotted lines for illustrative purposes. The UHF radiator portion 210 can include a first dipole arm 212 and a second dipole arm 212'. The second dipole arm 212' can be identical to the first dipole arm 212 and can include all the same components as the first dipole arm 212 described herein (e.g., referred to with a "prime" symbol herein).

The first dipole arm 212 can include a base portion 214, a first arm portion 220, a second arm portion 222, and a switchback portion 224. The base portion 214 can form the top of the first dipole arm 212. The base portion 214 can extend horizontally across a top end of the antenna assembly 200 (e.g., along the y-axis). The base portion 214 can include a first end 216 and a second end 218. The first arm portion 220 can extend from the first end 216 of the base portion 214. The first arm portion 220 can extend from the base portion 214 at an angle (e.g., between 0 and 90 degrees) relative to the base portion 214 in a direction towards the base 204. Similarly, the second arm portion 222 can extend from the second end 218 of the base portion 214. The second arm portion 222 can extend from the base portion 214 at an angle (e.g., between 0 and 90 degrees) relative to the base portion 214 in a direction towards the base 204. The first arm portion 220 and the second arm portion 222 can be co-planar. For example, the first arm portion 220 and the second arm portion 222 can extend at the same 0-degree angle from the base portion 214. The curvature or angle of the two arm portions 220, 222 relative to the base portion 214 can vary depending on the desired performance level of the antenna assembly 200. In some cases, the first arm portion 220 and the second arm portion 222 can be perceptibly planar with the base portion 214, extending at an angle of approximately zero degrees (e.g., less than 5-degrees). In some cases, the first arm portion 220 and the second arm portion 222 can be approximately perpendicular to the base portion 214, extending at an angle of approximately 90 degrees (e.g., between 80-degrees and 90-degrees). Generally, the best performance can be achieved at a 0-degree angle. However, angling the two arm portions 220, 222 relative to the base portion 214 can allow the cover 202 to be narrower (e.g., have a smaller diameter) which can improve the aerodynamic profile of the antenna assembly 200 as a whole. For example, the angle between the two arm portions 220, 222 and the base portion 214 can be selected to meet the desired profile and shape of the cover 202, while still providing the desired performance parameters of the UHF radiator portion 210. For example, in some cases, it may be preferable to have UHF radiator portion 210 with a 90-degree angle to further reduce the size and profile of the cover 202. In other examples, where size and aerodynamic profile are not a principal concern, an angle of 0-degrees can be used to optimize the performance of the UHF radiator portion 210.

The first arm portion 220 and the second arm portion 222 can be coupled to the switchback portion 224 on their second ends. For example, the switchback portion 224 can extend between the first arm portion 220 and the second arm portion 222. The switchback portion 224 can include a series of switchbacks 226. The switchbacks 226 can be rectangularly shaped. For example, the switchbacks 226 can be formed from a series of 90-degree turns in the switchback portion 224. The switchbacks 226 can be formed from serpentining the first dipole arm 212 back on itself. By including the switchbacks 226, one wavelength of line can be fit within the internal volume provided by the aerodynamic cover 202. For example, this technique can allow the total length of the first dipole arm 212 to be on the order of a wavelength of the total line length. It is recognized that in the context of coupling conductive material on a PCB, such as the arm portions 220, 222 and the switchback portion 224, these components can be formed from the same conductive material etched into the UHF PCB portion 270 to form the "coupling".

The first dipole arm 212 can include a first dipole feed portion 228. The first dipole feed portion 228 can be coupled to the base portion 214. For example, the first dipole feed portion 228 can extend from a central portion of the base portion 214. In some cases, the first dipole feed portion 228 can be orthogonal to the base portion 214. In some cases, the first dipole feed portion 228 can extend from the center of the base portion 214. Similarly, the second dipole arm 212' can include a second dipole feed portion 228' that is identical to the first dipole feed portion 228. The second dipole feed portion 228' can extend from the second base portion 214' in an opposite direction of the first dipole feed portion 228.

The antenna assembly 200 can include one or more vertical feed portions. In the illustrated implementation, the antenna assembly 200 include a first vertical feed portion 230 and a second vertical feed portion 232. The vertical feed portions 230, 232 can be configured to couple the UHF radiator portion 210 and VHF radiator portion 240, as explained herein. For example, the first dipole feed portion 228 of the UHF radiator portion 210 can be coupled to a top end of the first vertical feed portion 230. Similarly, the second dipole feed portion 228' of the UHF radiator portion 210 can be coupled to a top end of the second vertical feed portion 232.

Figure 3:
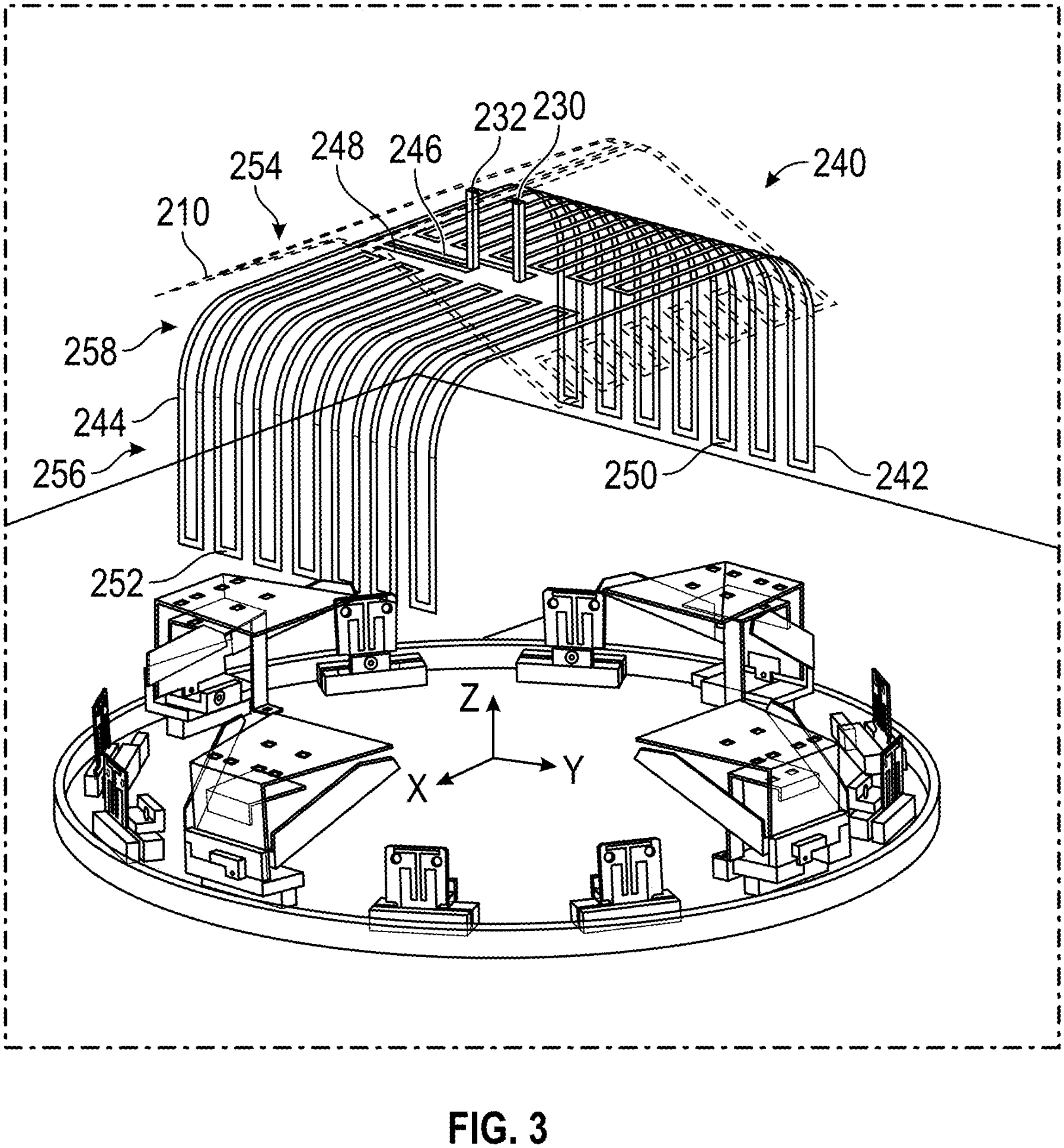
FIG. 3 illustrates a perspective view of the antenna assembly of FIG. 1 with the cover removed and highlighting a VHF radiator portion, in accordance with some aspects of this disclosure.

With reference to FIG. 3, the VHF radiator portion 240 is shown. The VHF radiator portion 240 can be a folded diploe that is bent and has a serpentine arm arrangement for the VHF band. The VHF radiator portion 240 can be conductive material (e.g., copper) etched into the structure of a PCB portion. For example, as shown more clearly in FIG. 5, the VHF radiator portion 240 can be formed on a VHF PCB portion 280. The VHF radiator portion 240 can be configured for operation in the very-high frequency range (e.g., between 30 MHz and 300 MHz). In FIG. 3, the UHF radiator portion 210 is shown in dotted lines for illustrative purposes. The VHF radiator portion 240 can be positioned below the UHF radiator portion 210 (e.g., close to the base 204). The VHF radiator portion 240 can be orthogonal to the UHF radiator portion 210 (e.g., at approximately 90-degrees). This arrangement can reduce the mutual coupling between the two horizontally polarized antennas that are configured to operate at two uniquely different frequency bands. The VHF radiator portion 240 can include a first loop portion 242 and a second loop portion 244.

The first loop portion 242 can include a first feed portion 246. The first feed portion 246 can be coupled to a bottom end of the first vertical feed portion 230. The first loop portion 242 can include a series of switchbacks 250. The switchbacks 250 can be rectangularly shaped. For example, the switchbacks 250 can be formed from a series of 90-degree turns in the first loop portion 242. Similarly, the second loop portion 244 can include a second feed portion 248. The second feed portion 248 can be coupled to a bottom end of the second vertical feed portion 232. The second loop portion 244 can included a series of switchbacks 252. The switchbacks 252 can be rectangularly shaped. For example, the switchbacks 252 can be formed from a series of 90-degree turns in the second loop portion 244. The switchbacks 250 can be formed from serpentining the first loop portion 242 back on itself. Similarly, the switchbacks 252 can be formed from serpentining the second loop portion 244 back on itself. By including the switchbacks 250, 252, one wavelength of line can be fit within the internal volume provided by the aerodynamic cover 202. For example, this technique can allow the total length of the first loop portion 242 to be on the order of a wavelength of the total line length and the total length of the second loop portion 244 to be on the order of a wavelength of the total line length.

In some implementations, the loop portions 242, 244 can be curved. In the illustrated example, the switchbacks 250, 252 of the loop portions 242, 244 extend between a first or horizontal section 254 and a second or vertical section 256, with a third or curved section 258 therebetween. For example, the horizontal section 254 can be perpendicular to the vertical section 256. As such, the curved section 258 can be a 90-degree bend. In some implementation, the bend of the curved section 258 can be between 0-degrees and 90-degrees. The curvature or bend of the curved section 258 can vary depending on the desired performance level of the antenna assembly 200. In some cases, the horizontal section 254 is perceptibly planar with the vertical section 256. For example, when the bend in the curved section 258 is approximately zero degrees (e.g., less than five degrees). In some cases, the horizontal section 254 can be approximately perpendicular to the vertical section 256. For example, when the bend in the 258 is approximately 90 degrees (e.g., between 80 degrees and 90 degrees). Generally, the best performance can be achieved when the curved section 258 has a 0-degree angle or bend. However, angling the vertical section 256 relative to the horizontal section 254 with a bent curved section 258 can allow the cover 202 to be narrower (e.g., have a smaller diameter) which can improve the aerodynamic profile of the antenna assembly 200 as a whole. For example, the angle of the curved section 258 can be selected to meet the desired profile and shape of the cover 202, while still providing the desired performance parameters of the VHF radiator portion 240. For example, in some cases, it may be preferable to have VHF radiator portion 240 with a 90-degree bend in the curved section 258 (e.g., as shown) to further reduce the size and profile of the cover 202. In other examples, where size and aerodynamic profile are not a principal concern, an angle of 0-degrees in the curved section 258 can be used to optimize the performance of the VHF radiator portion 240.

In some implementations, the UHF radiator portion 210 can be cross-polarized to the VHF radiator portion 240 (e.g., have orthogonal polarizations relative to each other). For example, one of the UHF radiator portion 210 and the VHF radiator portion 240 can have a vertical polarization and the other can have a horizontal polarization. This arrangement can minimize the mutual coupling between the UHF radiator portion 210 and the VHF radiator portion 240, which can be detrimental to the impedance match of the antenna assembly 200 in some cases.

In some implementations, it can be preferable to have a minimal amount of mutual coupling between the UHF radiator portion 210 and the VHF radiator portion 240. In the illustrated example, the UHF radiator portion 210 and the VHF radiator portion 240 are coupled at two points via the first vertical feed portion 230 and second vertical feed portion 232.

Figure 8:
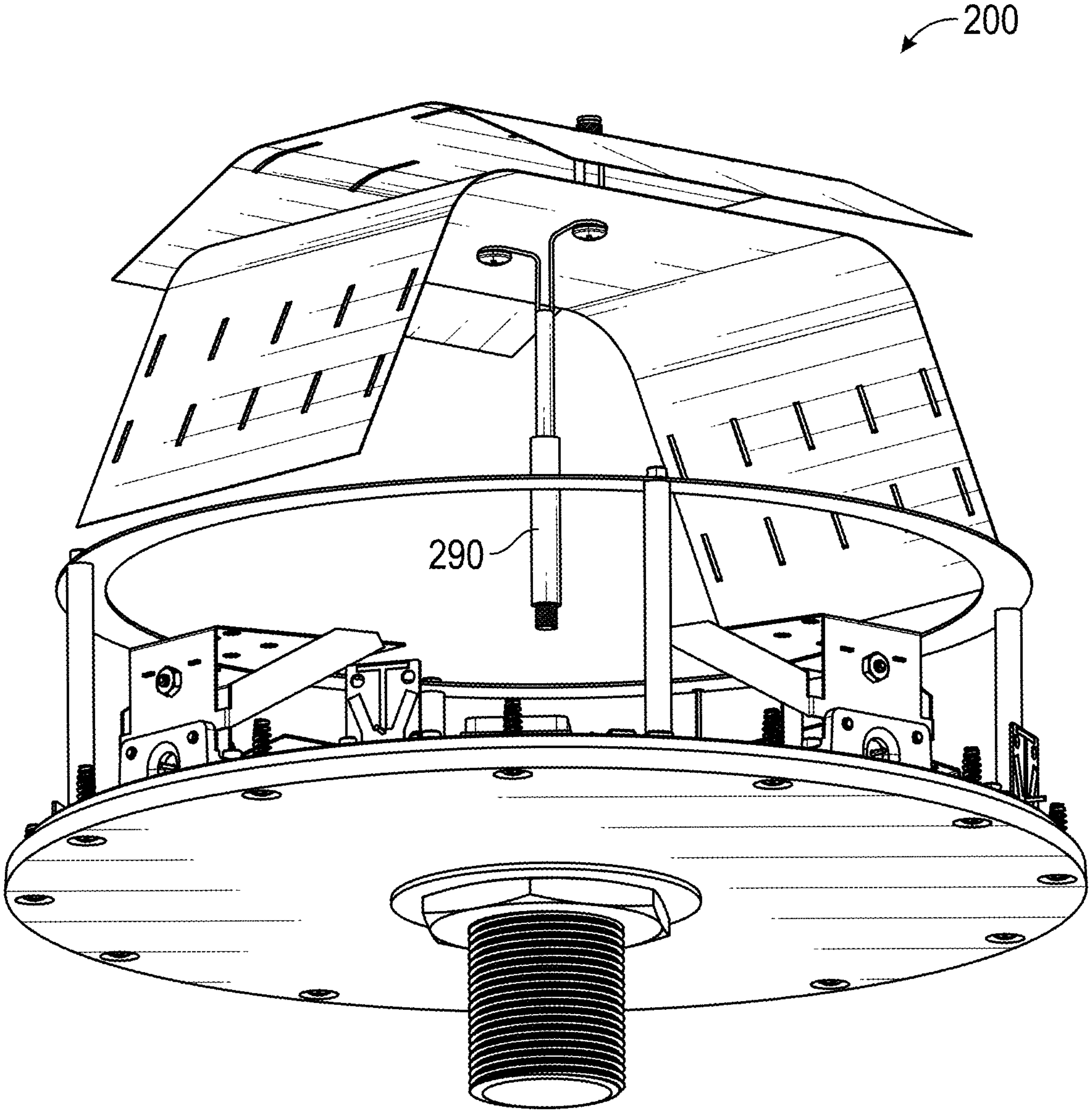
FIG. 8 illustrates a perspective view of the antenna assembly of FIG. 1, highlighting the transformer, in accordance with some aspects of this disclosure.

In some implementations, the antenna assembly 200 can include a transformer 290, shown in FIG. 8. The transformer 290 can be coupled to the bases or bottom ends of the vertical feed portion 230, 232. For example, the transformer 290 can be a balun or an impedance matching transformer. In some cases, the transformer 290 can be configured to convert an impedance from 75 ohms (e.g., a coaxial cable) to 300 ohms (e.g., a twin-lead transmission line). As both the UHF radiator portion 210 and the VHF radiator portion 240 can share a common feed point (e.g., the feed portions 230, 232), the common feed point can be used to create a dual band antenna from the UHF radiator portion 210 and the VHF radiator portion 240. Including a transformer 290 that extends vertically from the vertical feed portion 230, 232 towards the central hole 207 can provide certain benefits. For example, no additional structures may be required to route the transformer 290 to the coaxial cables. This arrangement can increase the amount of space available in the antenna assembly 200 such that the total size of the antenna assembly 200 can be reduced, which is desirable.

According to some implementations of an antenna assembly, the cover and base when coupled define an internal compact volume of less than about 1200 cubic inches. In some implementations, the internal compact volume can be between about 200 cubic inches and between about 1200 cubic inches, between about 300 cubic inches and between about 1000 cubic inches, between about 400 cubic inches and between about 900 cubic inches, between about 500 cubic inches and between about 800 cubic inches, between about 600 cubic inches and between about 700 cubic inches, and/or between about 650 cubic inches and between about 680 cubic inches.

The impedance of the UHF radiator portion 210 and the VHF radiator portion 240 is inherently different. For example, the classical impedance of a two-arm dipole, like the UHF radiator portion 210, is approximately 70 ohms while the classical impedance of a half wave folded dipole, like the VHF radiator portion 240, is approximately 280 ohms. The spacing between the UHF radiator portion 210 and the VHF radiator portion 240 can provide the reactive match to tune the UHF radiator portion 210 and VHF radiator portion 240 when using an off-the-shelf 75 ohm to 300 ohm impedance transformer for terrestrial TV bands. In the illustrated arrangement, the UHF radiator portion 210 and VHF radiator portion 240 do not interfere with the cellular antennas (e.g., the multi-band radiator portions 100).

Figure 4A:
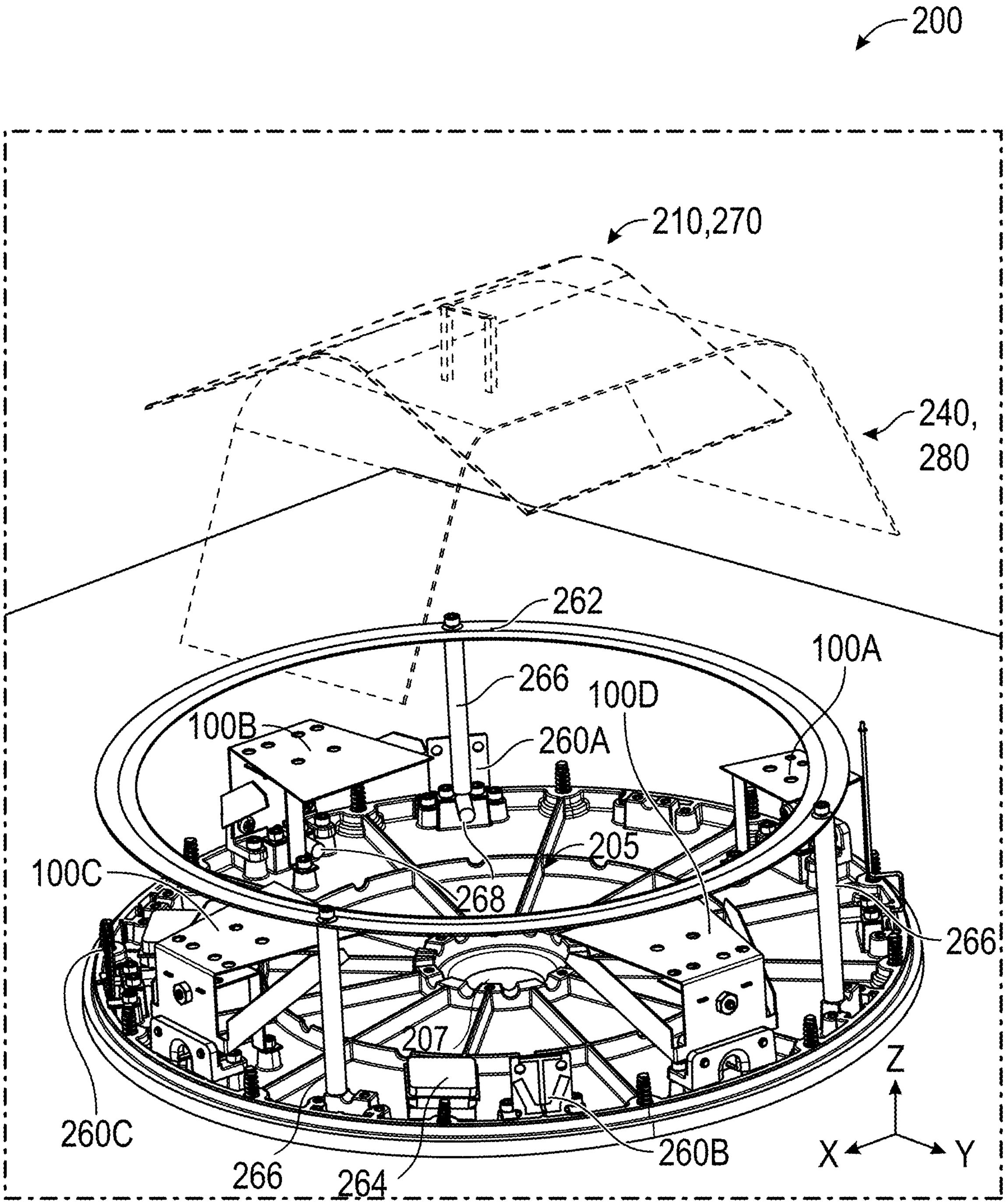
FIG. 4A illustrates a perspective view of the antenna assembly of FIG. 1 with the cover removed and highlighting the base and one or more telecommunication radiator portions, in accordance with some aspects of this disclosure.
Figure 4B:
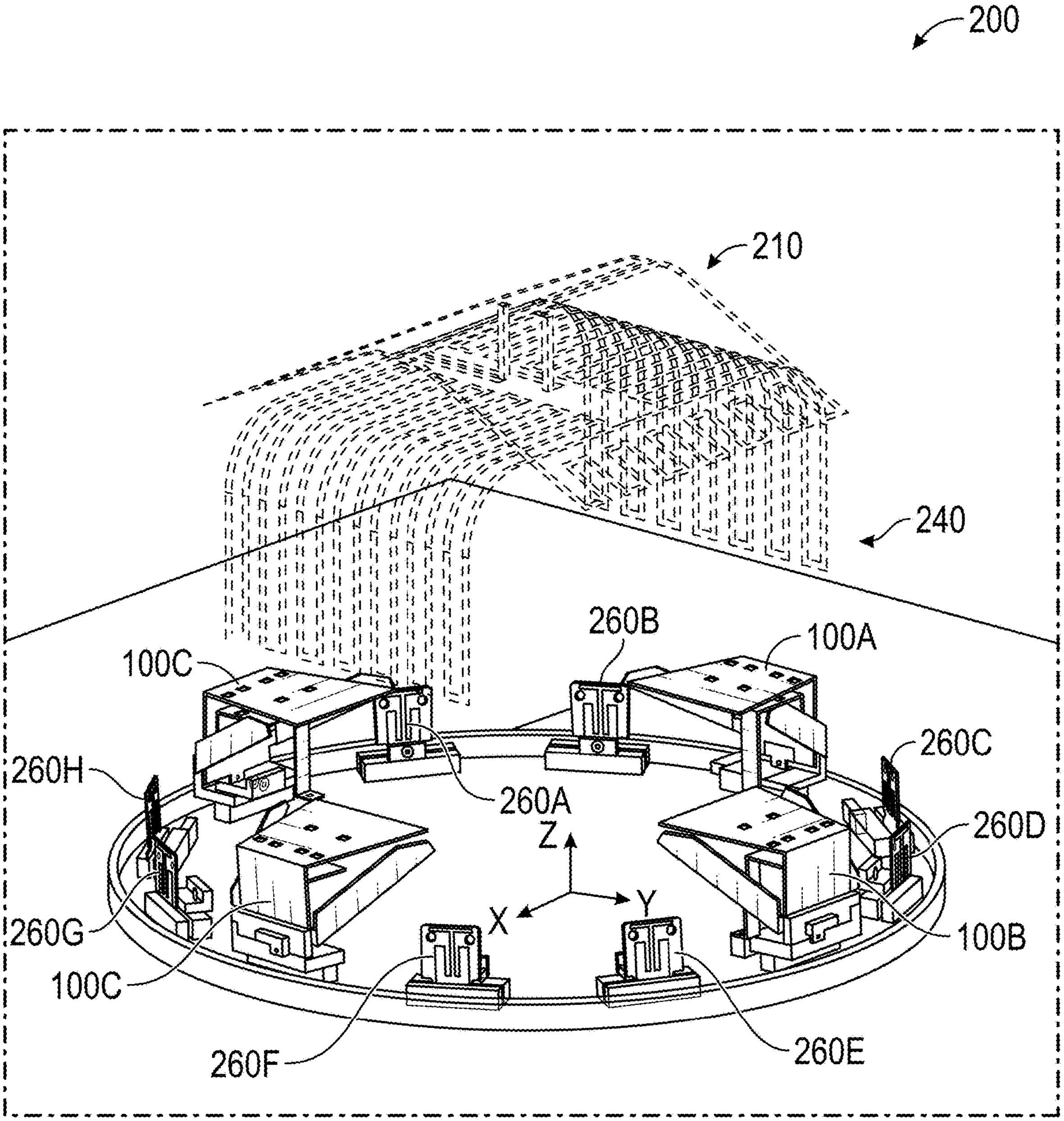
FIG. 4B illustrates a perspective view of the antenna assembly of FIG. 1 with the cover removed and highlighting the base and one or more telecommunication radiator portions, in accordance with some aspects of this disclosure.

FIGS. 4A and 4B illustrate perspective views of the base 204 and the various antenna components that can be included in the antenna assembly 200. Either of the two bases 204 shown in FIGS. 4A and 4B can be used in the antenna assembly 200 interchangeability, including the various antenna components discussed with reference to these Figures. In some cases, it can be preferable to use the base 204 shown in FIG. 4A because of the additional antenna components along with other features described herein.

FIG. 4A shows the one or more multi-band radiator portions 100, and one or more dual-band WiFi radiator portions 260, the AM-FM radiator portion 262, and the GPS radiating portion 264 of the antenna assembly 200. In FIG. 4A, the UHF radiator portion 210 and the VHF radiator portion 240 are shown in dotted lines for illustrative purposes. In the illustrated example, the antenna assembly 200 includes four multi-band radiator portions 100A, 100B, 100C, 100D (collectively referred to as the multi-band radiator portions 100). However, more or less multi-band radiator portions 100 are possible. The multi-band radiator portions 100 can be used for wireless telecommunication purposes. In the illustrated example, the antenna assembly 200 includes three dual-band WiFi radiator portions 260A, 260B, and 260C (collectively referred to as the one or more dual-band WiFi radiator portions 260). However, more or less one or more dual-band WiFi radiator portions 260 are possible. The one or more dual-band WiFi radiator portions 260 can be used for un-licensed band wireless telecommunication purposes. Depending on the particular use, the number of multi-band radiator portions 100 and one or more dual-band WiFi radiator portions 260 can vary. The location of the dual-band WiFi radiator portions 260 and/or the multi-band radiator portions 100 about the base 204 can be selected to have the least amount of impact on the performance of the dual-band antenna formed from the UHF radiator portion 210 and the VHF radiator portion 240. In some cases, one or more of the dual-band WiFi radiator portions 260 can be configured for Bluetooth communication. For example, one or more of the radiator portions 260 can be a Bluetooth radiator portion 260. The multi-band radiator portions 100 are described further herein with reference to FIGS. 6A-6K. As shown in FIG. 4A, each of the multi-band radiator portions 100 and the dual-band WiFi radiator portions 260 can be coupled to an individual coaxial cable 268.

The AM-FM radiator portion 262 can be used to transmit and/or receive RF signals in the amplitude modulation ("AM") and frequency modulation ("FM") RF bands. The frequency range for AM broadcasting typically spans from around 530 kHz to 1700 kHz and the FM frequency range usually falls between 88 MHz and 108 MHz. The AM-FM radiator portion 262 can be a ring or loop supported by a plurality of rods 266 and/or standoffs. In one example, the AM-FM radiator portion 262 is a 350-degree loop. The AM-FM radiator portion 262 can be printed trace on a PCB (e.g., FR4 substrate). The plurality of rods 266 and/or standoffs can be coupled to the base 204. The AM-FM radiator portion 262 can be elevated above the base 204, which can form the ground plane for the antenna assembly 200. The AM-FM radiator portion 262 can be positioned above the multi-band radiator portions 100 and the dual-band WiFi radiator portions 260 and below the UHF radiator portion 210 and the VHF radiator portion 240 in the assembled antenna assembly 200. The AM-FM radiator portion 262 can extend around an inside edge of the cover 202. The AM-FM radiator portion 262 can have sufficient arm length to create an antenna element that does not interfere with the cellular antennas (e.g., the multi-band radiator portions 100) or the television antennas (e.g., the UHF radiator portion 210 and the VHF radiator portion 240). Generally, none of the antennas of the antenna assembly 200 (e.g., the multi-band radiator portions 100, the UHF radiator portion 210, the VHF radiator portion 240, or the AM-FM radiator portion 262) interfere with the dual-band WiFi radiator portions 260.

The GPS radiating portion 264 can be used to collect one or more signal(s) from geosynchronous satellites so that the GPS function of a radio including the antenna assembly 200 can determine where the antenna assembly 200 is positioned relative to a global coordinate system. The GPS radiating portion 264 may be positioned within the cover 202 and supported by the base 204 in the assembled antenna assembly 200. In the assembled antenna assembly 200, the GPS radiating portion 264 may be electrically and/or mechanically coupled to the base 204.

FIG. 4B shows an alternate arrangement of telecommunication components of the antenna assembly 200. In the example of FIG. 4B, the antenna assembly 200 may not include an AM-FM radiator portion 262 or a GPS radiating portion 264. However, the arrangement of FIG. 4B can include these components in other implementations. Notably, the arrangement shown in FIG. 4B includes additional dual-band WiFi radiator portions. In this example, the antenna assembly 200 can include eight dual-band WiFi radiator portions, such as the additional dual-band WiFi radiator portions 260D, 260E, 260F, 260G, 260H.

Figure 5:
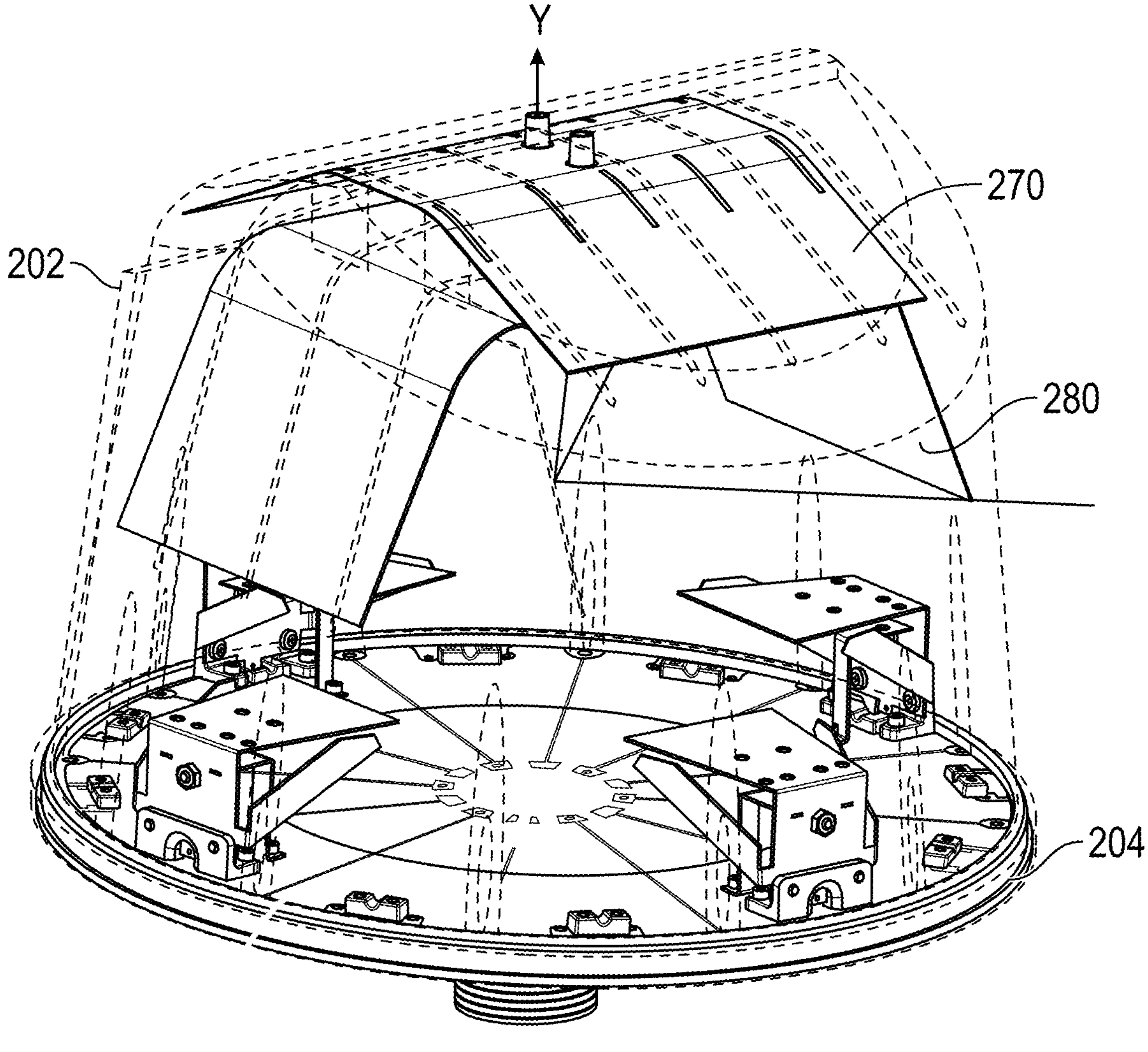
FIG. 5 illustrates a perspective view of the antenna assembly of FIG. 1 with the cover removed and highlighting support portions for the UHF radiator portion and the VHF radiator portion, in accordance with some aspects of this disclosure.

With reference to FIG. 5, a UHF PCB portion 270 and a VHF PCB portion 280 are shown. In FIG. 5, the base 204, the UHF radiator portion 210, and the VHF radiator portion 240 are not shown in detail for illustrative purposes. Additionally, the dual-band WiFi radiator portions 260 are not shown in FIG. 5.

The antenna assembly 200 can include the UHF PCB portion 270 to provide the structure for the UHF radiator portion 210 and the VHF PCB portion 280 to provide the structure for the VHF radiator portion 240. The UHF PCB portion 270 can be configured to provide support and/or mechanical stiffness for the UHF radiator portion 210. The UHF radiator portion 210 can be coupled to/formed on the UHF PCB portion 270. As such, the UHF PCB portion 270 can define the shape of the UHF radiator portion 210. Similarly, the VHF PCB portion 280 can be configured to provide support and/or mechanical stiffness for the VHF radiator portion 240. The VHF radiator portion 240 can be coupled to/formed on the VHF PCB portion 280. As such, the VHF PCB portion 280 can define the shape as the VHF radiator portion 240. The PCB portions 270, 280 can be made of flexible substrate materials (e.g., polyimide). As such, the PCB portions 270, 280 may be flex circuits. In some cases, the PCB portions 270, 280 may be fiberglass reinforced with epoxy (e.g., FR4). When the PCB portions 270, 280 are utilized, the available manufacturing methods for the antenna assembly 200 that can be employed can be expanded. Packaging a large number of radiators for different bands and applications allows for an economy of space on the deployed platform as well as ease of installation for both the antenna assembly 200, the associated radios and television receiver, and the coaxial cables in between.

In the antenna assembly 200, the base 204 can serve as the ground reference for at least one or more of the radiating portions described herein (e.g., the multi-band radiator portions 100, the one or more dual-band WiFi radiator portions 260, etc.). As shown in FIG. 4A, the base 204 can include an internal ribbing network 205 and a central hole 207. The internal ribbing network 205 can be used to route the coaxial cables 268 from the various telecommunication components (e.g., the multi-band radiator portions 100, the dual-band WiFi radiator portions 260, etc.) to the central hole 207. In some implementations, the antenna assembly 200 can include a separate ground reference portion that can be housed within the antenna assembly 200 (e.g., between the cover 202 and the base 204). In this example, the separate ground reference portion can be a printed circuit board ("PCB") portion with an internal ground plane. For example, the internal ground plane can either be formed on the bottom side of the PCB portion or may be a separate component from the base PCB portion. For example, the internal ground plane can be a solderable sheet metal material such as brass, copper, tin plated steel, and/or the like. In some implementations, the internal ground plane may be formed on the bottom side of the PCB portion of the separate ground reference portion. For example, the internal ground plane may be a conductive surface (e.g., brass, copper, tin plated steel, and/or the like) formed on the bottom side of the PCB portion.

Figure 7A:
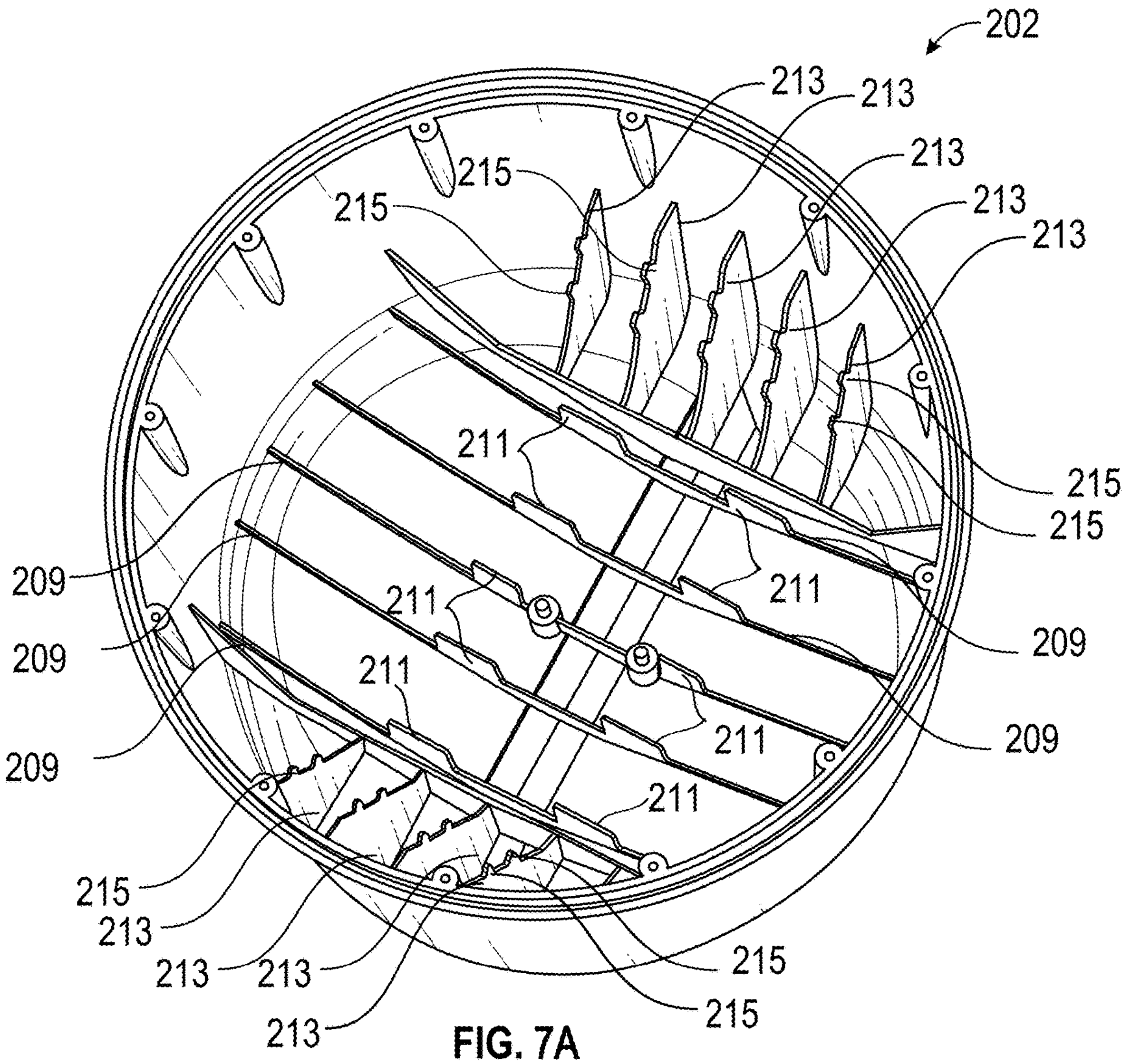
FIG. 7A illustrates a perspective bottom isolation view of the cover of the antenna assembly of FIG. 1, in accordance with some aspects of this disclosure.
Figure 7B:
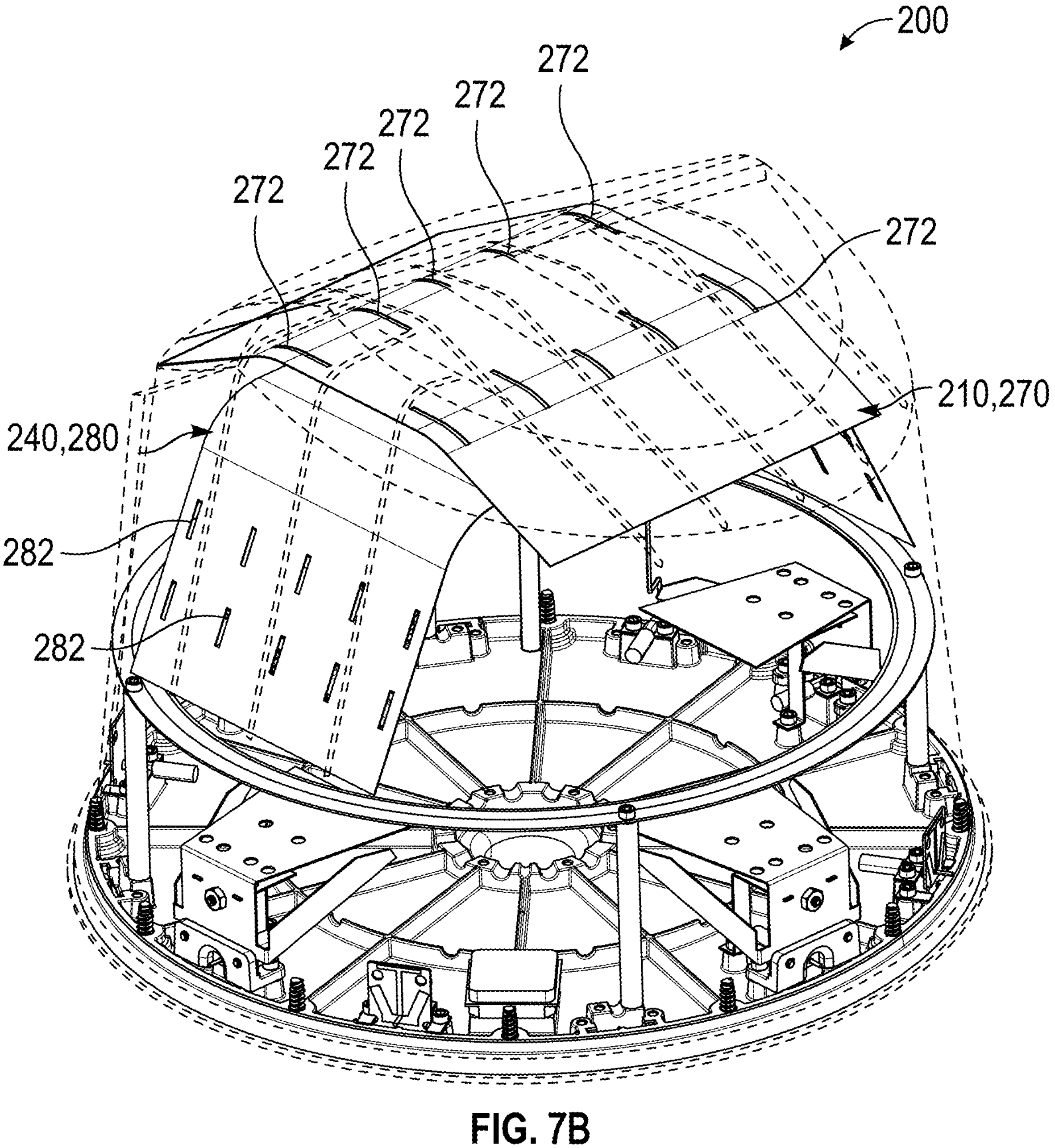
FIG. 7B illustrates a perspective view of the antenna assembly of FIG. 1 with the cover in dashed lined, in accordance with some aspects of this disclosure.

FIG. 7A illustrates a bottom perspective view of the cover 202 in isolation. FIG. 7B illustrates a perspective view of the antenna assembly 200 with the cover shown in dotted lines to illustrate the interaction between the cover 202 and the UHF PCB portion 270 and VHF PCB portion 280. As shown in FIG. 7A, the cover 202 can include a plurality of first ribs 209 and/or a plurality of second ribs 213. The ribs 209, 213 may extend from the interior surface of the cover 202.

The plurality of first ribs 209 can be configured to provide mechanical support for the UHF radiator portion 210. The plurality of first ribs 209 can be thin extensions of the cover 202 that are arranged in a row. The plurality of first ribs 209 can extend from the internal top surface of the cover 202 towards the base 204. The plurality of first ribs 209 can include projections or catch points 211. For ease of illustration, only certain first ribs 209 and catch points 211 are labeled in FIG. 7A. The catch points 211 can be angled projections extending from the plurality of first ribs 209. The catch points 211 can be configured to extend through slots in the UHF PCB portion 270 and engage the UHF PCB portion 270. For example, as shown in FIG. 7B, the UHF PCB portion 270 can include a plurality of slots 272. For ease of illustration, only certain slots 272 are labeled in FIG. 7B. Each slot 272 can receive a corresponding catch point 211 such that the UHF PCB portion 270 can be mechanically coupled to and/or supported by the cover 202. The plurality of slots 272 can be positioned in the UHF PCB portion 270 such that the plurality of slots 272 do not interrupt the UHF radiator portion 210. For example, the plurality of slots 272 do not cross any of the conductive material that forms the UHF radiator portion 210 on the UHF PCB portion 270.

The plurality of second ribs 213 can be configured to provide mechanical support for the VHF radiator portion 240. The plurality of second ribs 213 can be thin extensions of the cover 202 that are arranged in a row. The plurality of second ribs 213 can extend from the internal side walls and/or top surface of the cover 202. The plurality of second ribs 213 can be orthogonal to the plurality of first ribs 209. The plurality of second ribs 213 can include projections or catch points 215. For ease of illustration, only certain second ribs 213 and catch points 215 are labeled in FIG. 7A. The catch points 215 can be angled projections extending from the plurality of second ribs 213. The catch points 215 can be configured to extend through slots in the VHF PCB portion 280 and engage the VHF PCB portion 280. For example, as shown in FIG. 7B, the VHF PCB portion 280 can include a plurality of slots 282. For ease of illustration, only certain slots 282 are labeled in FIG. 7B. Each slot 282 can receive a corresponding catch point 215 such that the VHF PCB portion 280 can be mechanically coupled to and/or supported by the cover 202. The plurality of slots 282 can be positioned in the VHF PCB portion 280 such that the plurality of slots 282 do not interrupt the VHF radiator portion 240. For example, the plurality of slots 282 do not cross any of the conductive material that forms the VHF radiator portion 240 on the VHF PCB portion 280.

Including the cover 202 with ribs 209. 213 can provide certain benefits. For example, the UHF radiator portion 210 and VHF radiator portion 240 of the antenna assembly 200 can be supported by the cover 202. This arrangement can eliminate the need for an internal support structure for the UHF radiator portion 210 and the VHF radiator portion 240. As such, the volume of the antenna assembly 200 can be greatly reduced, without compromising the performance of the antenna elements. As noted herein, reducing the volume of the antenna assembly 200 generally improves the aerodynamic performance of the antenna assembly 200 in operation, which is desirable.

In some implementations, other methods of coupling the UHF PCB portion 270 and the VHF PCB portion 280 to the cover 204 can be used. For example, various attachment features, such as fasteners, pins, hooks, and/or the like could be used to couple the UHF PCB portion 270 and the VHF PCB portion 280 to the base 204. In some cases, it may be preferable that the connection mechanisms be made of non-conductive material so as to not interfere with the UHF radiator portion 210 and VHF radiator portion 240. In one example, non-conductive fasteners and bolts could be used.

FIGS. 6A-6K illustrate various views of components of the multi-band radiator portions 100, in accordance with some aspects of this disclosure. Each multi-band radiator portion 100 can include a multi-band radiating element 101 and a ground connection 103. The ground connection 103 is configured to couple multi-band radiating element 101 to the base 204. FIGS. 6A and 6C-6F illustrate assorted view of the multi-band radiating element 101. FIGS. 6B and 6G-6K illustrate the ground connection 103. It is recognized that the multi-band radiator portions 100 described herein are just one example of multi-band radiator portions that can be included in the antenna assembly 200. In other implementations, different multi-band radiator portions can be included. The antenna assembly 200 can include multi-band radiator portions that are similar or identical to any of the antennas described and/or illustrated in U.S. patent application Ser. No. 11/283,149, filed Sep. 30, 2019, titled "ANTENNA SYSTEM" and in U.S. patent application Ser. No. 17/712,000, filed Apr. 1, 2022, titled "ANTENNA SYSTEM," the entire contents of both of which are hereby incorporated by reference in their entirety.

Figure 6A:
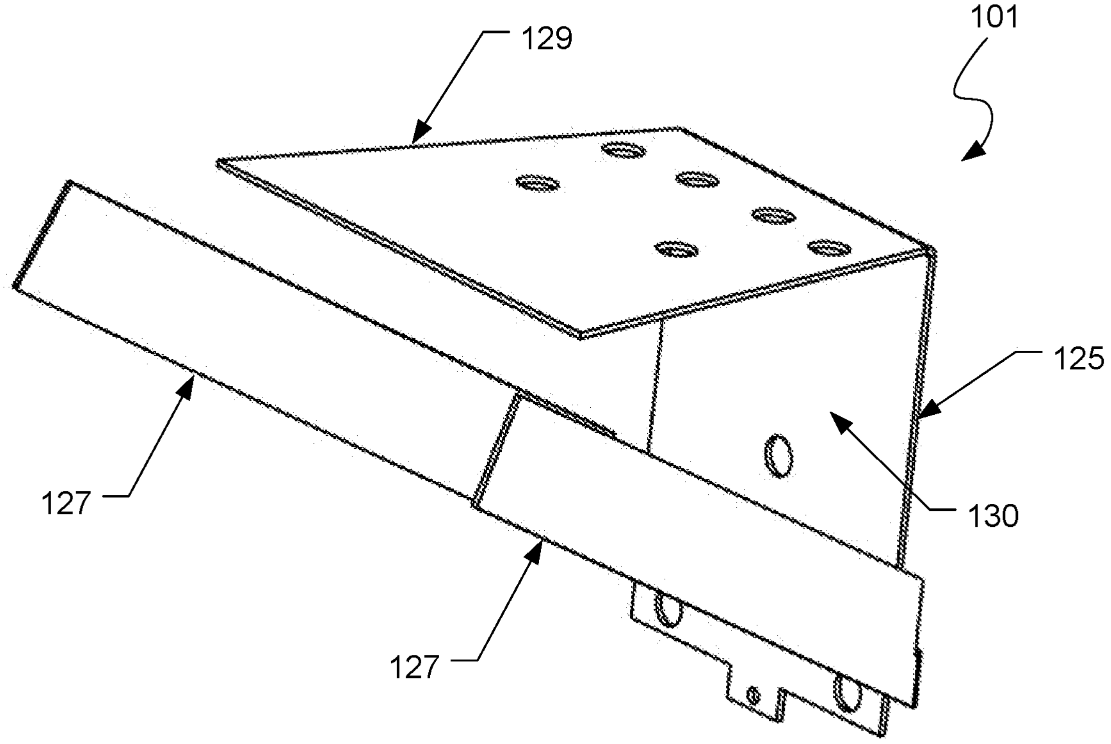
FIGS. 6A-6K illustrate various views of components of a multi-band radiator portion of the antenna assembly of FIG. 1, in accordance with some aspects of this disclosure.

As shown in FIG. 6A, a radiating element 101 can be one element or component of the multi-band radiator portion 100. An upright low band radiation portion 125 (also referred to herein as the "body portion 125") can be a body portion of the radiating element 101. The upright low band radiation portion 125 can be coupled to a feeding portion at a feed point 119 (see e.g., FIG. 6C) to electrically excite the radiating element 101. As shown in FIG. 6A, a second low band radiation portion 129 (also referred to herein as the "head portion 129") can be positioned at an angle relative to the body portion (e.g., the upright low band radiation portion 125) and extend such that the second low band radiation portion 129 is not coplanar with the upright low band radiation portion 125. In some other implementations, the second low band radiation portion 129 can be configured without a bend such that it is coplanar with the upright low band radiation portion 125. In some implementations, advantages of a bend can include having two distinct low band radiating portions, reducing the total height of the system to be more compact and conserve space, and configuring the system to be able to easily cover and provide protection for the system in a compact configuration with multi-band coverage (e.g., in the antenna assembly 200). In some other implementations the second low band radiation portion 129 can be coupled to a third low band radiation portion, a fourth low band radiation portion, and/or other radiation portions. In some implementations, material forming the second low band radiation portion 129 can extend in a direction further away from the upright low band radiation portion 125 and comprise a slit between the material such that portion of material on each side of the slit may form a third low band radiation portion and a fourth low band radiation portion respectively, that may be coplanar with and extend beyond the second low band radiation portion 129. In some implementations the third and fourth low band radiation portions can be the same length and width. In some implementations, the length and/or width of the third low band radiation portion may be different from the length and/or width of the fourth low band radiation portion. In some implementations, one or more of the third low band radiation portion and the fourth low band radiation portion may be angled or bent or attached such that it is not coplanar with the second low band radiation portion 129. Adding variations in radiation portions can provide advantageous coverage in different areas of bandwidth in some implementations.

In some cases, the radiating element 101 is a modified printed inverted-F antenna (PIFA) modified to have three bent arm members that make the radiating element 101 a three-dimensional antenna as opposed to a two-dimensional antenna generally practiced in the art for printed inverted F antennae. Furthermore, the radiating element 101 can be a dual band monopole antenna that has a configuration that, when used in conjunction with high order electromagnetic modes generated or received by a transceiver and/or receiver (as is typically performed for PIFA antennae), permit the radiating element 101 to have an operating frequency range of 600 MHz to 6.0 GHz.

The low band portions (e.g., upright low band radiation portion 125, the second low band radiation portion 129, any additional low band radiation portions) can be configured for radiation in the low band, including low band odd multiples. The high band radiation portion can comprise one or more arms 127 configured for high band radiation. The two arms 127 can be coupled to a lower portion of the upright low band radiation portion 125. In some implementations, the arms 127 can be coupled to an upper portion of the upright low band radiation portion 125. In some other implementations, one or more additional arms can be coupled to an upper portion of a low band radiation portion (e.g., upright low band radiation portion 125, the second low band radiation portion 129, etc.). In some implementations the arms 127 can have the same length. In some implementations arms 127 can have different lengths. In some implementations, one or more of the arms 127 can be positioned at an angle relative to the upright low band radiation portion 125 and/or relative to a ground plane (e.g., which can be defined by the base 204). The arms 127 can be positioned at the same angle or at different angles. The arms 127 can be configured for radiation in the high band, including high even order resonances. In some implementations, additional arm portions can be added or formed at selected locations to add coverage for additional high frequency bandwidth areas. For example, in some implementations portions of the arms may be slit, extended, angled, bent, modified, and/or otherwise connected to provide improved coverage areas.

Figure 6B:
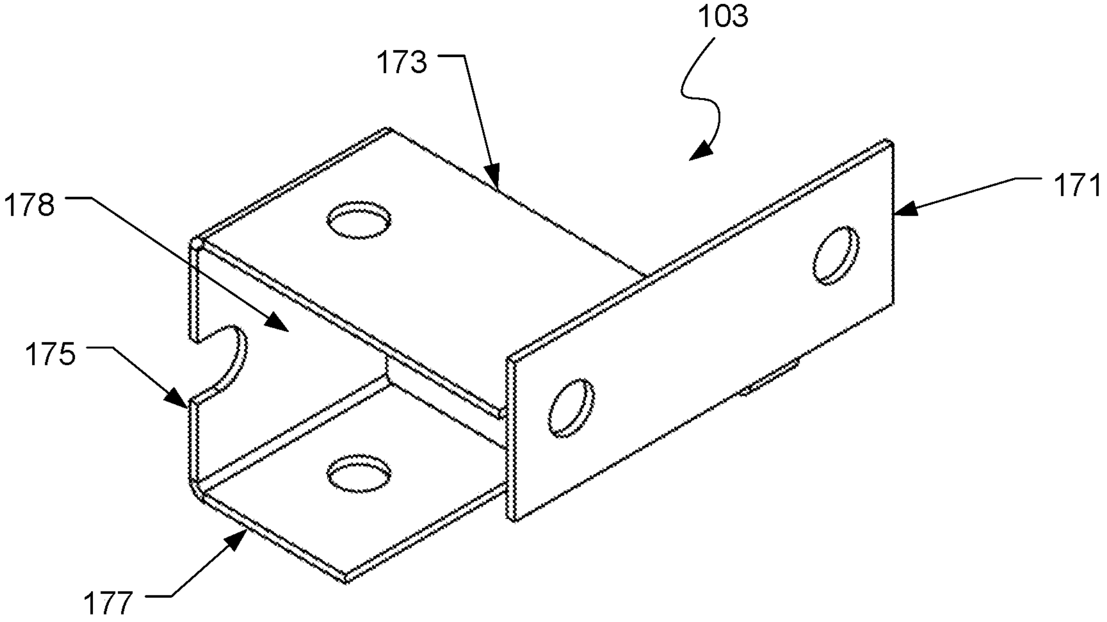
Figure 6C:
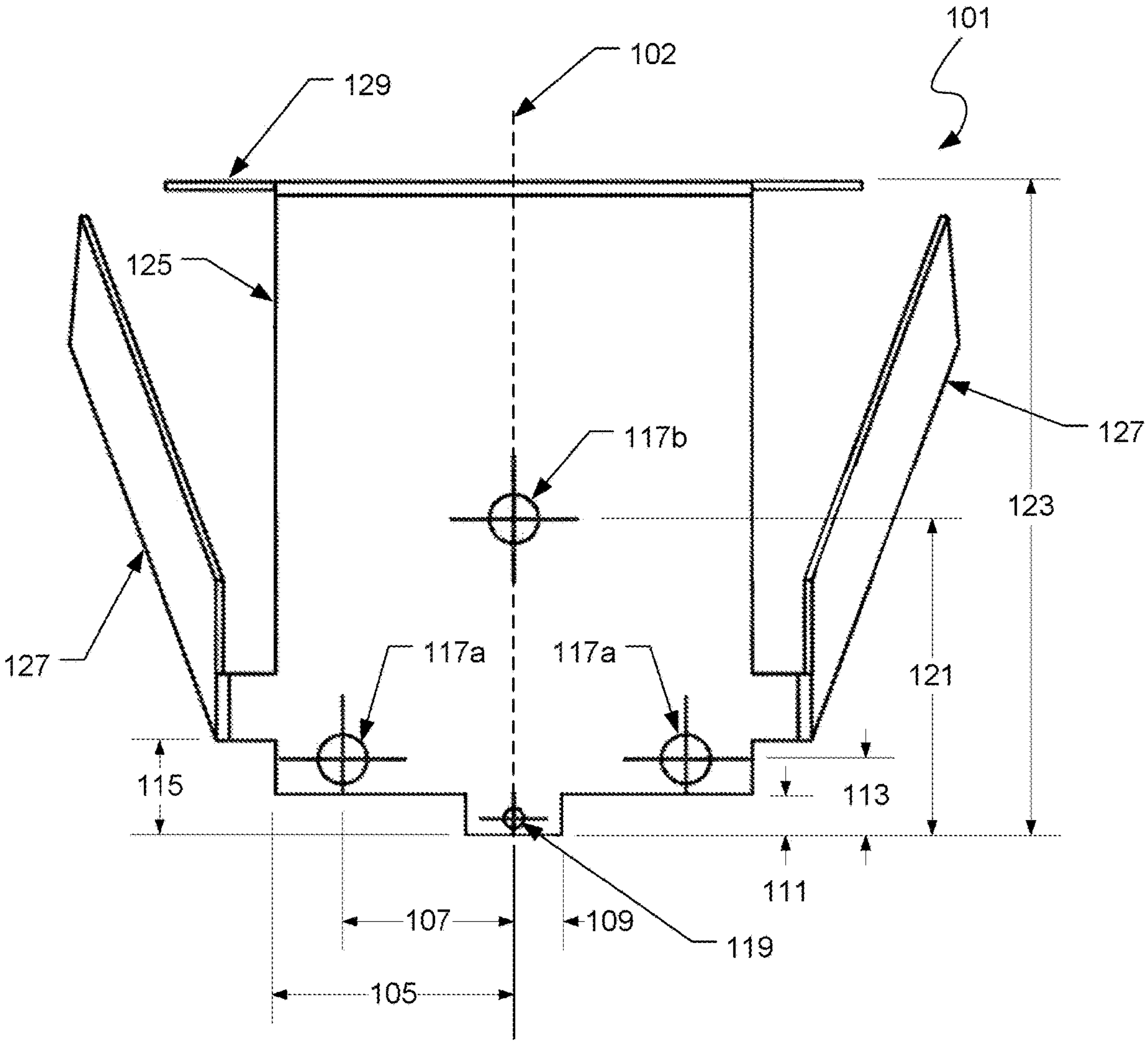

As shown in FIG. 6B, a ground connection 103 (also referred to herein as the "tuner 103") can be adapted and configured to couple the radiating element 101 with the base 204. The tuner 103 can include a face plate 171 that is configured to be coupled to the base 204. The tuner 103 can include an arm portion 173, which can be an arm portion coupled to the face plate 171. The width of arm portion 173 can be adjusted to accommodate clearance for transmission lines (not shown) of the base 204, which can be used to excite the radiating element 101. Low band operation of the multi-band radiator portions 100 is enhanced and can be adjusted by the length and width of body portion 125 and head portion 129 as well as the location, placement and configuration of an opening 117*b* (see e.g., FIG. 6C) in body portion 125. The tuner 103 can include a base portion 177. The base portion 177 can be adapted and configured to be positioned against the body portion 125 of the radiating element 101 such that the opening in the base 177 and the opening 117*b* can be a point of coupling creating a ground connection for the multi-band radiator portion 100. The raised ground connection being elevated relative to the feed location provides advantages to achieve the multiband coverage. Dimensions can be selected to provide harmonic resonance at higher odd orders in some implementations. The grounding portion provides advantages for achieving multiple advantageous resonances. For example, in some implementations, the height, width, and clearance provided for by the size of arm portion 173 can be advantageously selected. Additionally, the length and width of body portion 175 can also be advantageously selected. The location of opening 117*b* and the corresponding connecting location of the coupling point 181*b*, shown in FIG. 6J, when coupled together for the grounding connection create a symbiotic connection to provide a resonance of desired impedance to match a desired frequency and bandwidth for a low band frequency configuration in some implementations. FIG. 6C shows twin coupling points 117*a* of the radiating element 101. The twin coupling points 117*a* can be used to attach the multi-band radiator portion 100 to a nonconductive structural stand coupled to the base 204. More isolation can be created from the ground reference portion 290 by expanding the space 113. The feed point location 119 is configured to receive an electrical connection to excite the radiating element 101.

In some other implementations, features and aspects of the multi-band radiator portions 100 can be further described as follows. FIG. 6C illustrates the radiating element 101 that can be coupled to the base 204 of the antenna assembly 200 shown in FIG. 4A, and electrically excited at the feed point 119. The feed point 119 can be coupled to the upright low band radiation portion 125 with what can be a narrow width tab 109. Additional isolation between the upright low band radiation portion 125 and the base 204 can be obtained by adjusting 111 and consequently the coupling location reference 113. For additional mechanical support, the upright low band radiation portion 125, can have a non-conductive coupling mechanism (not shown) to the base 204. The upright low band radiation portion 125 can have a coupling point 117*b* for attaching the grounding portion 103 with the coupling point 181*b* (see e.g., FIG. 6J). As noted above, also coupled to the upright low band radiation portion 125 can be two arms 127. The arms 127 can assist with the dominate radiation in the high band for the multi-band radiator portion 100. One or more portions similar to the arms 127 may be used for assisting in the high band portion of the radiation are realizable in the implementation of this approach. Higher even order resonances may radiate from portions similar to the arms 127 of the radiating element 101 to assist in the multi-band properties of the device. Furthermore, there can be the additional head portion 129 coupled to the upright low band radiation portion 125 that may be perpendicular in nature for its orientation. Though it is not necessary for it to be bent near 90-degrees as depicted in this illustration and can be shown to be perceptibly straight in other implementations, by bending the low band radiation portion of the radiating element 101 to realize two distinct portions (e.g., the upright low band radiation portion 125 and the second low band radiation portion 129), the total height of the radiating element 101 is reduced and as such the total volume of the cover 202 of the antenna assembly 200 to most likely provide environmental protection is consequently reduced. The low band operation of the radiating element 101 is determined by several factors. Some of the factors are the length and width of upright low band radiation portion 125 and of second low band radiation portion 129, the location of opening 117*b*, and/or the grounding portion 103.

FIG. 6B illustrates the grounding portion of the device 103. The face plate 171 can be coupled to the arm 173. The width of the arm 173 can be adjusted to accommodate clearance for assembly purposes for a transmission line of the antenna assembly 200 that may be used for excitation of the multi-band radiator portion 100. The body 175 can be coupled to arm 173. The base 177 can be coupled to the body 175. The base 177 can also have a coupling point 178 that is configured to couple to the opening 117*b* of the radiating element 101 in the assembled multi-band radiator portion 100. The height of the arm 173, the width of the arm 173, the clearance provided for in the arm 173, the length of body 175, and the symbiotic location of opening 117*b* and coupling point 181*b* all provide for a reactance that counterbalances the reactance of the low band impedance to provide a resonance of desired impedance match for the desired frequency and bandwidth for the low band radiation. The location of the coupling point 181*b* and the length and width of the grounding portion 103 are also chosen to provide higher odd order resonant harmonics at the desired locations to cover a portion of the frequency band of the multi-band performance of the antenna assembly 200.

FIG. 6C illustrates a back side view of the radiating element 101. Twin coupling points 117*a* in the radiating element 101 may be coupled to a non-conductive object (not shown), which can be coupled to the base 204 of the antenna assembly 200 shown in FIG. 4A. This coupling may provide mechanical stability for the multi-band radiator portions 100 while not disturbing or inhibiting the ground connection provided by tuner 103. Table 1 below may provide dimensions that might be used to construct a portion of such multi-band radiator portions 100.

Figure 6D:
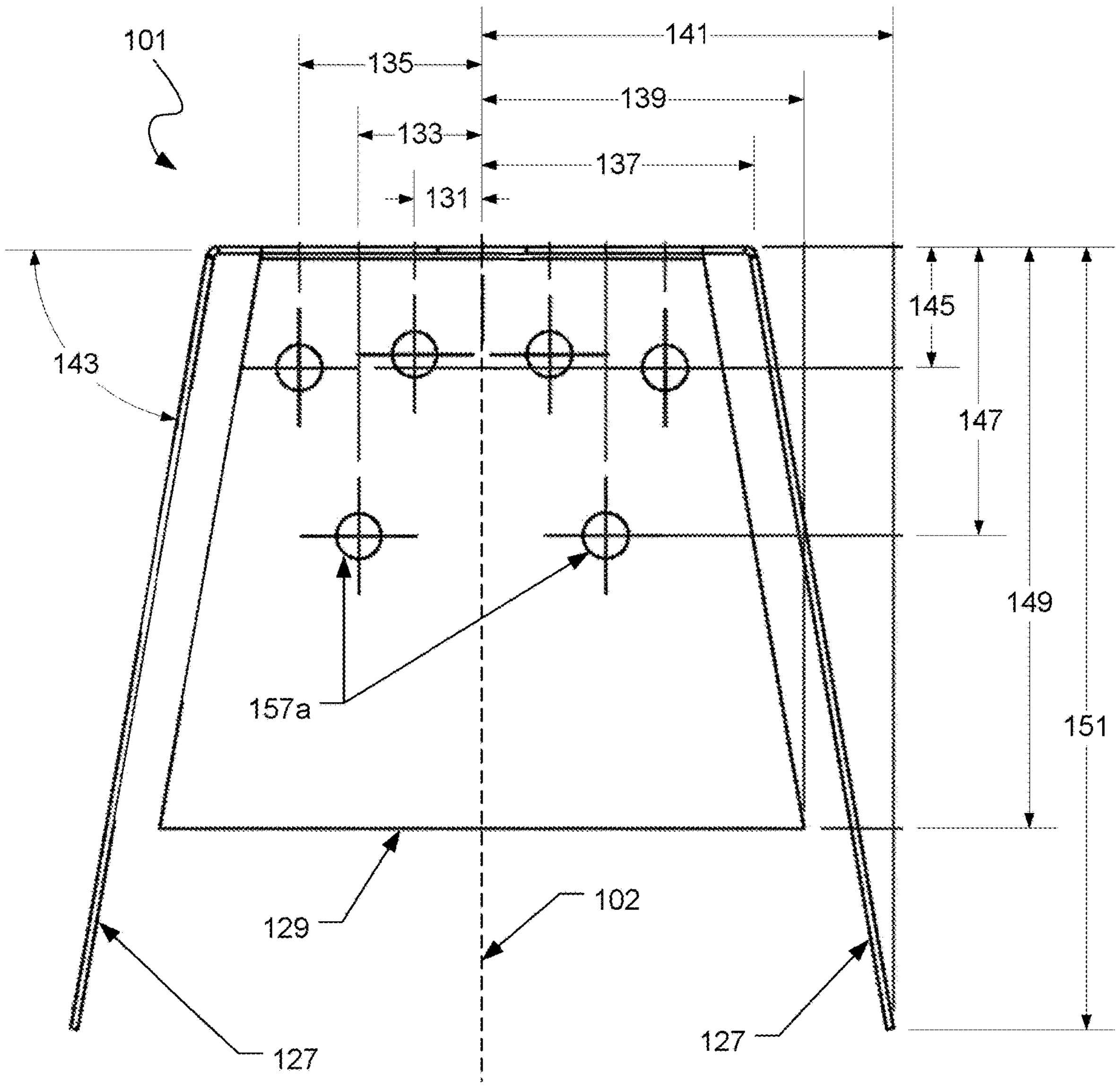
Figure 6E:
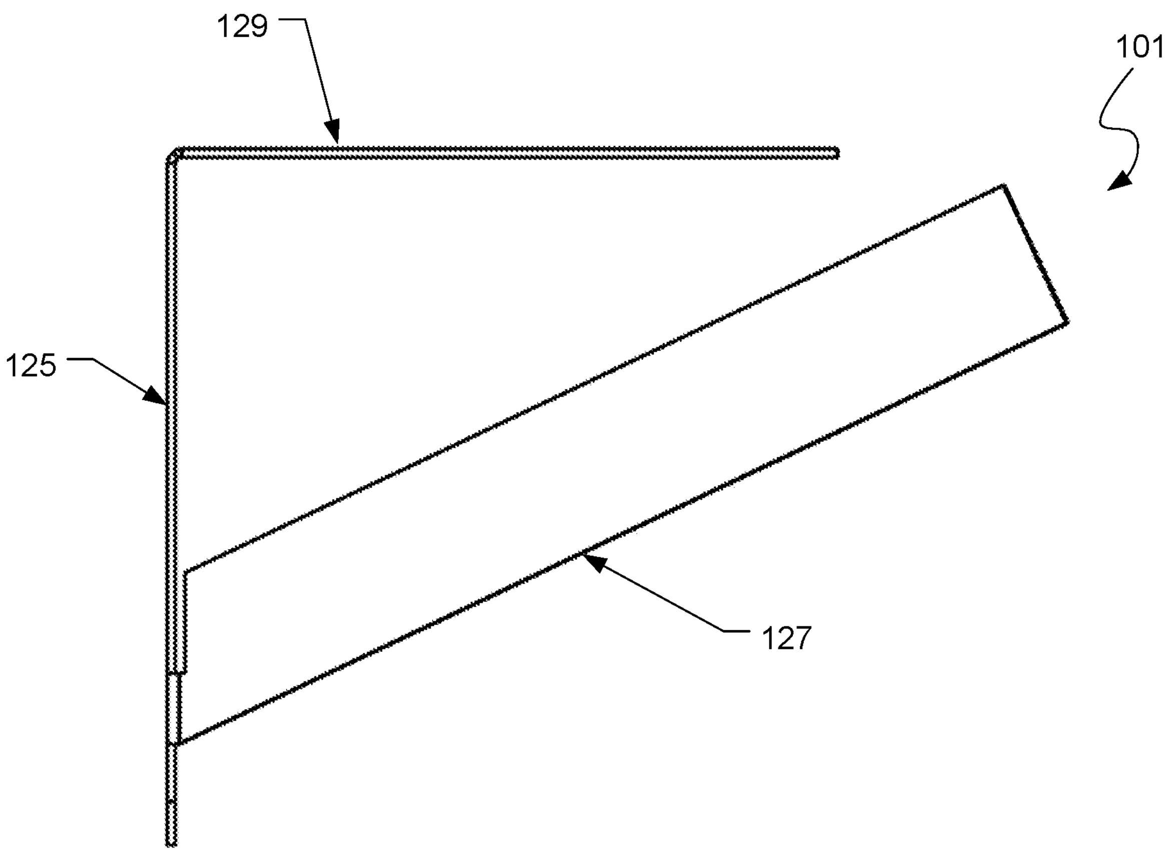
Figure 6F:
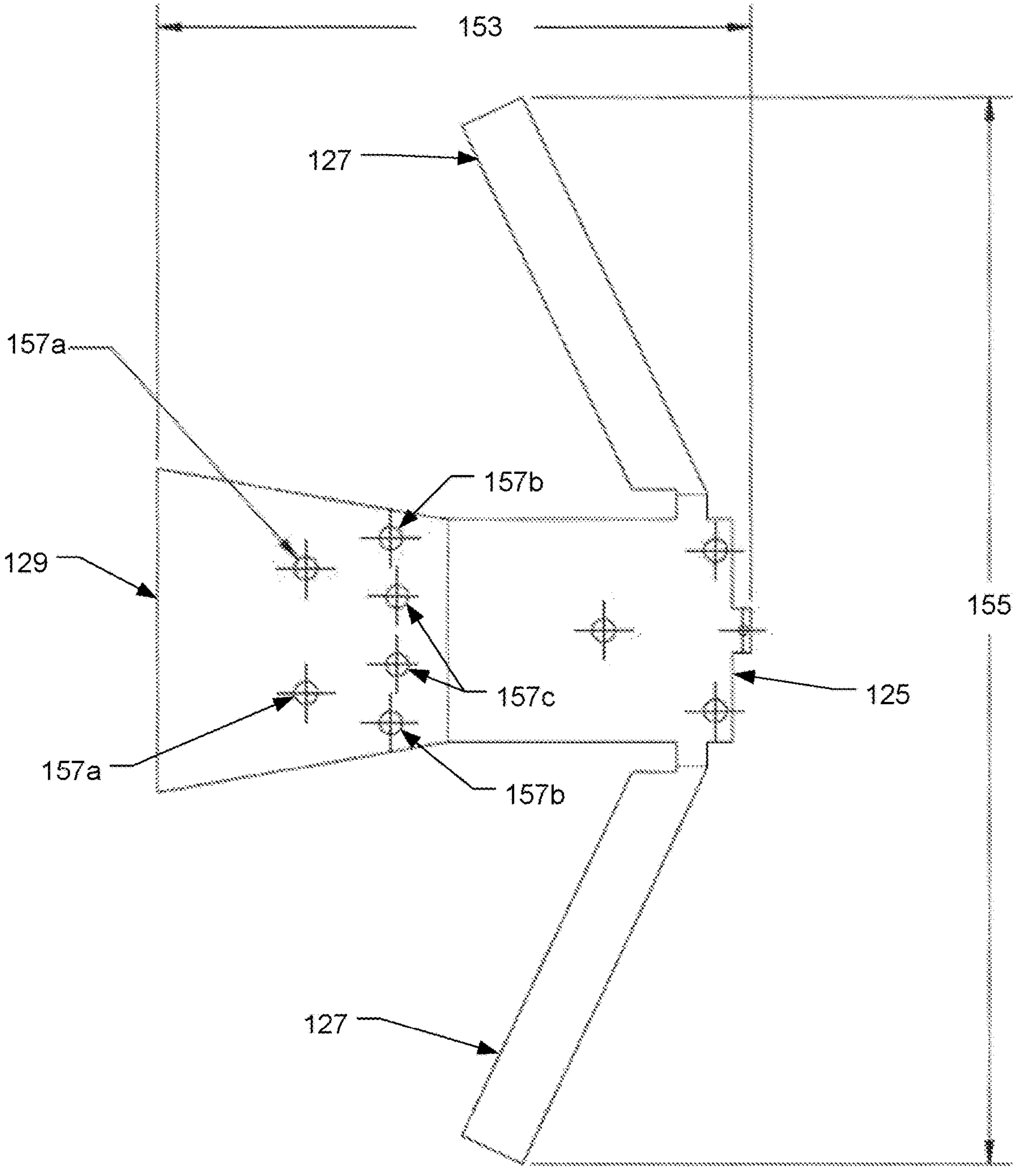
Figure 6G:
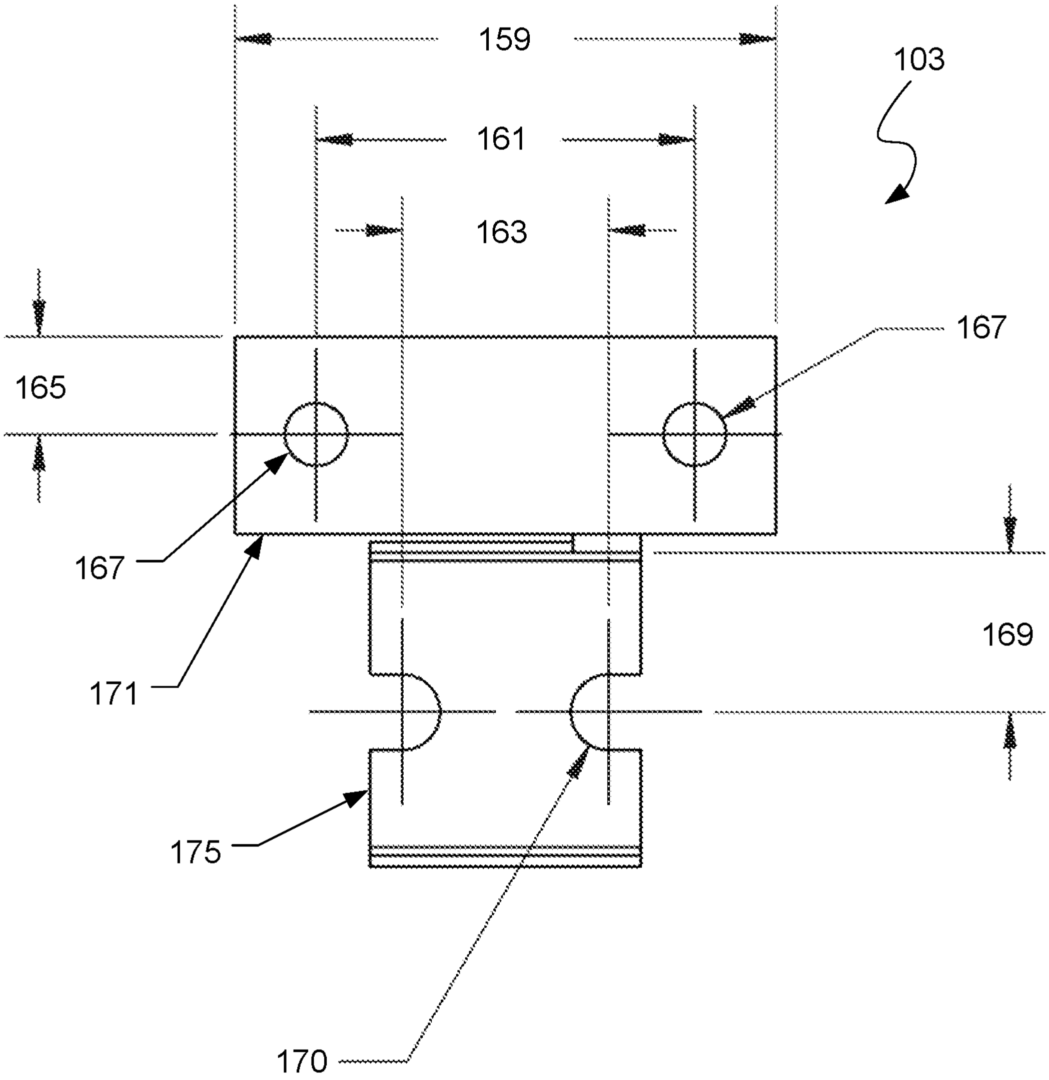
Figure 6H:
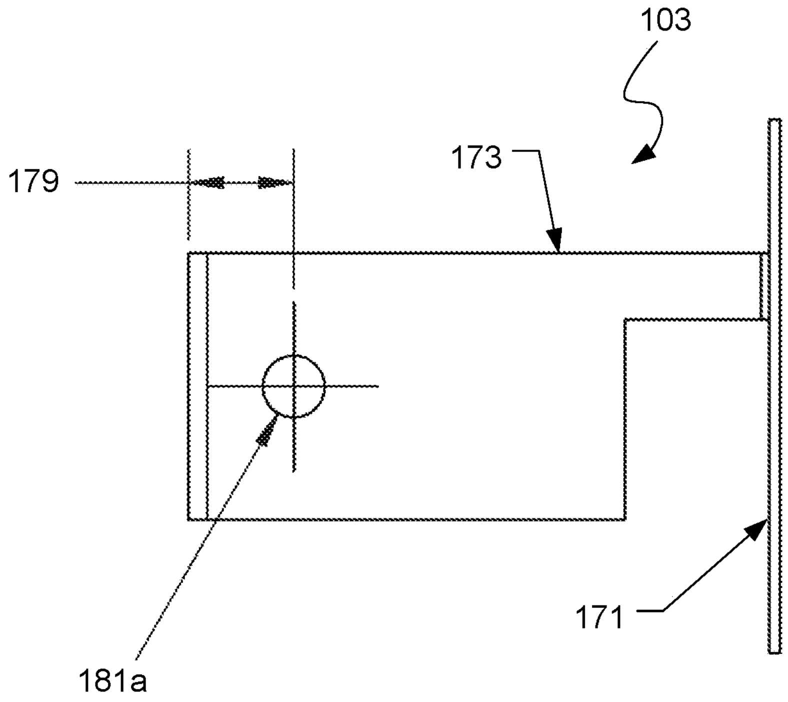
Figure 6I:
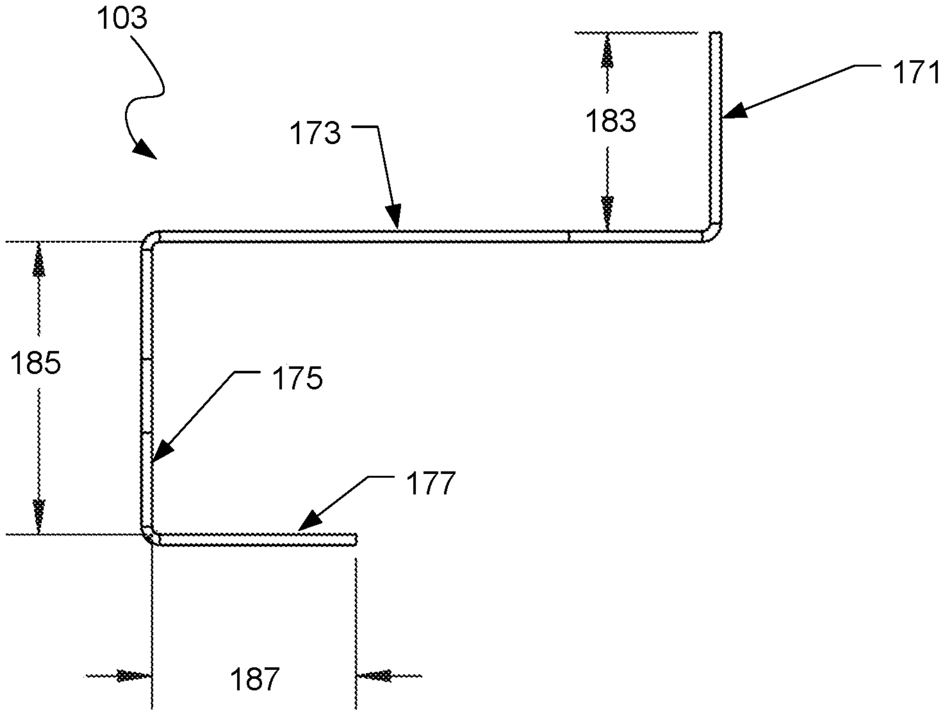
Figure 6J:
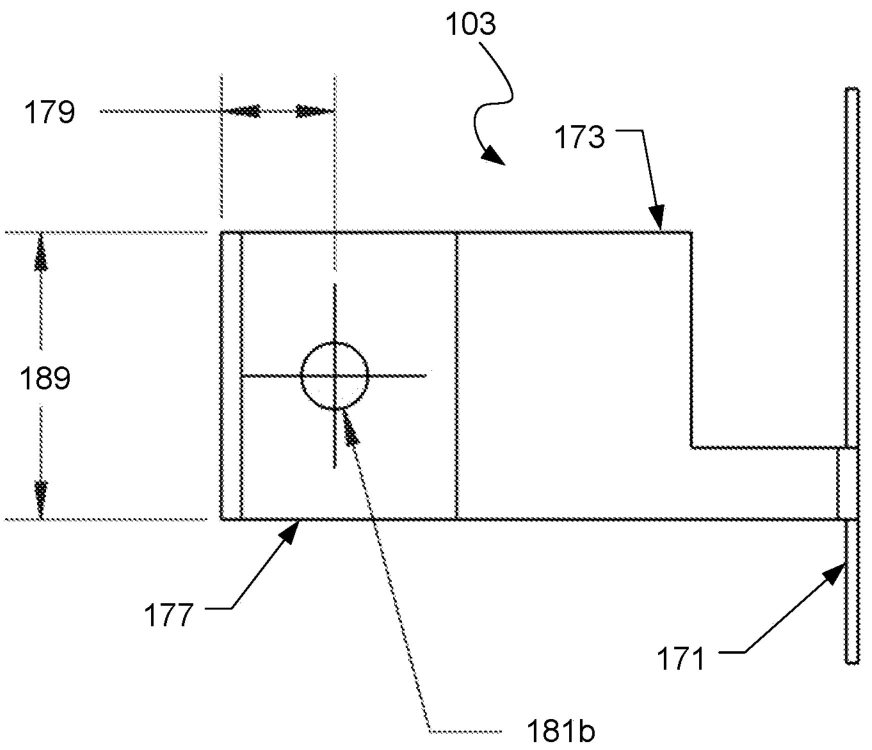
Figure 6K:
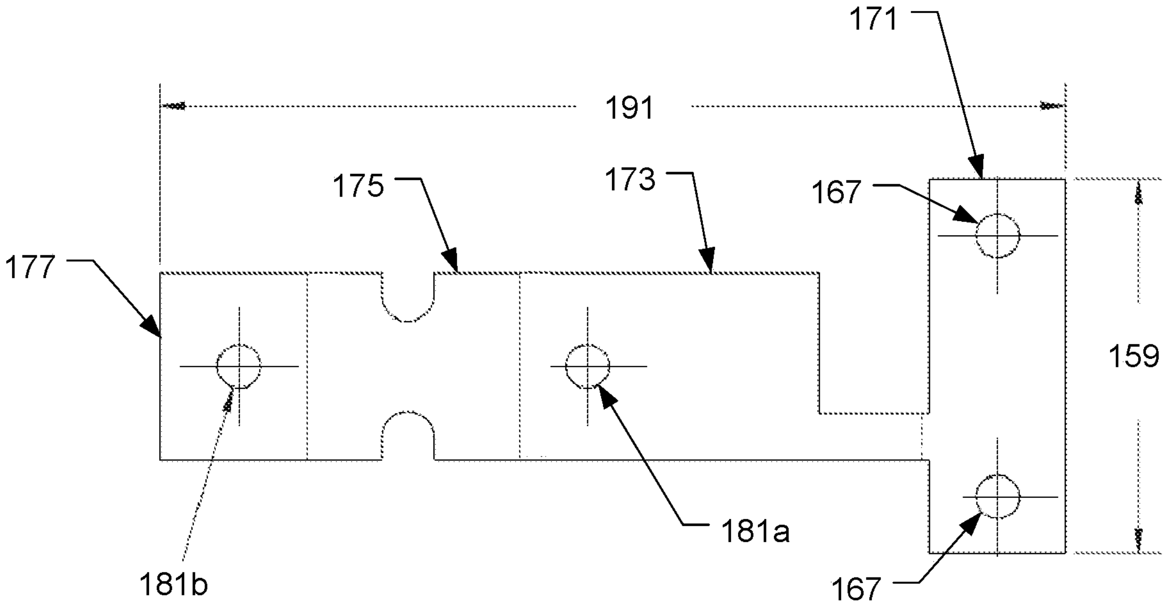

FIGS. 6D-6F provide additional views of the radiating element 101. As shown in FIGS. 6D and 6F, the second low band radiation portion 129 can include one or more clearances. For example, the second low band radiation portion 129 can include one or more first clearances 157*a*, one or more second clearances 157*b*, and/or one or more third clearances 157*c*. The clearances 157*a*, 157*b*, 157*c* may allow for ease of assembly of the completed multi-band radiator portions 100. Table 1 below may provide dimensions that might be used to construct a portion of such a device as the radiating element 101 depicted in FIGS. 6A and 6C-6F.

FIG. 6G-6K provide additional views of the ground connection 103 of the multi-band radiator portions 100. Table 2 below may provide dimensions that might be used to construct a portion of such a device.

In some implementations, features and aspects of the antenna assembly 200 can include a multi-band radiator portion have a radiating element comprising a conductive sheet having a body portion, a head portion, a first arm, and a second arm. The body portion has a front face and preferably configured to be positioned in an upright orientation during use as a first resonating component of a three-dimensional radiating element. The head portion preferably is integrally connected to the body portion along an upper edge of the body portion such that the head portion extends at a first angle relative to the body portion. The head portion preferably is configured to extend in the direction of the front face of the body portion during use of the head portion as a second resonating component of the three-dimensional radiating element. The first arm preferably is integrally connected to the body portion along a first side edge of the body portion such that the first arm extends at a second angle relative to the body portion. The first arm is preferably configured to extend in the direction of the front face of the body portion during use of the first arm as a third resonating component of the three-dimensional radiating element. The second arm is preferably integrally connected to the body portion along a second side edge of the body portion such that the second arm extends at third angle relative to the body portion. The second arm is preferably configured to extend in the direction of the front face of the body portion during use of the second arm as a fourth resonating component of the three-dimensional radiating element. At least one of the first, second, third, and fourth resonating components of the three-dimensional radiating element is preferably configured to resonate within a low frequency band of between 600 MHz and 700 MHz during use. At least one of the first, second, third, and fourth resonating components of the three-dimensional radiating element is preferably configured to resonate within a high frequency band of between 2.7 GHz and 6.0 GHz during use.

According to some implementations, a first aperture is preferably located proximate to a bottom edge of the body portion. The first aperture can be a soldering aperture for connecting the body portion to an antenna connection. The body portion, the head portion, and the first and second arms can have a thickness at or within 0.01 to 0.03 inches. The first angle can be at or within 89-91 degrees. The second angle can be at or within 79-81 degrees and the third angle can be at or within 79-81 degrees. At least one of the first and second resonating components of the three-dimensional radiating element is preferably configured to resonate within a low frequency band of between 600 MHz and 700 MHz during use. At least one of the third and fourth resonating components of the three-dimensional radiating element is preferably configured to resonate within a high frequency band of between 2.7 GHz and 6.0 GHz during use. The body portion preferably has an aperture along a symmetry line configured to be electrically coupled to a ground reference base. The head portion preferably has a set of apertures proximate to the upper edge of the body portion.

In some implementations, the high band radiation portion comprises two arms preferably coupled to the base of the upright low band radiation portion. In some implementations, the high band radiation portion comprises a single arm preferably coupled to the base of the upright low band radiation portion. In some implementations, the high band radiation portion comprises a plurality of arms preferably coupled to the base of the upright low band radiation portion. In some implementations, the high band radiation portion comprises one or more arms coupled to a low band radiation portion. In some implementations, the high band radiation portion comprises a plurality of arms having the same length. In some implementations, the high band radiation portion comprises a plurality of arms having different lengths.

In some implementations, the upright low band radiation portion can be coplanar with the second low band radiation portion. In some implementations, the upright low band radiation portion is preferably not coplanar with the second low band radiation portion.

In some other implementations, features and aspects of the antenna assembly 200 can include one or more multi-band radiator portion, each multi-band radiator portion comprising a feeding portion, a grounding portion, an upright low band radiation portion, a second low band radiation portion, a third low band radiation portion of one length coupled to the second low band radiation portion, a fourth low band radiation portion of a length similar to the third low band radiation portion while coupled to the second low band radiation portion and not contacting to the third low band radiation portion, and a high band radiation portion. The high band radiation portion can be as described and/or shown herein in various combinations. Relative configurations of the upright low band radiation portion and second low band radiating portion can be as described and/or shown herein in various combinations.

In some other implementations, features and aspects of the antenna assembly 200 can include one or more multi-band radiator portion, each multi-band radiator portion comprising a feeding portion, a grounding portion, an upright low band radiation portion, a second low band radiation portion, a third low band radiation portion of one length coupled to the second low band radiation portion, a fourth low band radiation portion of a length different from the third low band radiation portion while coupled to the second low band radiation portion and not contacting to the third low band radiation portion, and a high band radiation portion. The high band radiation portion can be as described and/or shown herein in various combinations. Relative configurations of the upright low band radiation portion and second low band radiating portion can be as described and/or shown herein in various combinations.

Referring back to FIG. 6A, a perspective view of the radiating element 101 of the multi-band radiator portion 100 is illustrated in accordance with an implementation of the antenna assembly 200. Components of radiating element 101 can be symmetrical with respect to a symmetry line 102 shown in FIG. 6C. Dimensions for one exemplary implementation of the radiating element 101 are included in Table 1.

TABLE 1

| Label Number | Distance (Inches) |
|---|---|
| 105 | 0.615-0.635 |
| 107 | 0.440-0.460 |
| 109 | 0.115-0.135 |
| 111 | 0.097-0.117 |
| 113 | 0.190-0.210 |
| 115 | 0.238-0.258 |
| 117a | 0.119-0.139 (Diameter) |
| 117b | 0.119-0.139 (Diameter) |
| 119 | 0.042-0.062 (Diameter) |
| 121 | 0.821-0.841 |
| 123 | 1.705-1.725 |
| 131 | 0.181-0.201 |
| 133 | 0.340-0.360 |
| 135 | 0.508-0.528 |
| 137 | 0.750-0.770 |
| 139 | 0.902-0.922 |
| 141 | 1.156-1.176 |
| 145 | 0.333-0353 |
| 147 | 0.809-0.829 |
| 149 | 1.640-1.660 |
| 151 | 2.205-2.225 |
| 153 | 3.324-3.344 |
| 155 | 5.990-6.010 |
| 157a | 0.119-0.139 (Diameter) |
| 157b | 0.119-0.139 (Diameter) |
| 157c | 0.119-0.139 (Diameter) |

In one implementation, the radiating element 101 is manufactured as cut-out from a sheet of metal having a thickness of 0.02 inches and has the associated members bent to a corresponding angle. In other implementations, the thickness of radiating element 101 can range from 0.01 to 0.03 inches. In one implementation, the radiating element

101 is formed such that each arm of arms 127 are folded towards a front face (i.e., the face 130) of the body portion 125 by an angle 143. In an exemplary implementation, the angle 143 is at or within 79-81 degrees. In one implementation, the head portion 129 is folded towards the front face of the body portion 125 at an angle at or within 89-91 degrees. In an exemplary implementation, the arms 127 and the head portion 129 have a fold radius at or within 0.005-0.025 inches respective to the body portion 125.

Referring back to FIG. 6B, a perspective view of the grounding portion 103 of the multi-band radiator portion 100 is illustrated in accordance with an implementation of the antenna assembly 200. Dimensions for an exemplary implementation of tuner 103 are included in Table 2.

TABLE 2

| Label Number | Distance (Inches) |
|---|---|
| 159 | 0.995-1.005 |
| 161 | 0.695-0.705 |
| 163 | 0.377-0.387 |
| 165 | 0.176-0.186 |
| 167 | 0.111-0.121 (Diameter) |
| 169 | 0.290-0.300 |
| 170 | 0.136-0.146 |
| 179 | 0.192-0.202 |
| 181a | 0.111-0.121 (Diameter) |
| 181b | 0.111-0.121 (Diameter) |
| 183 | 0.375-0.385 |
| 185 | 0.555-0.565 |
| 187 | 0.385-0.395 |
| 189 | 0.495-0.505 |
| 191 | 2.421-2.431 |

As described herein, the tuner 103 can have a plurality of apertures. For example, the tuner 103 can include one or more apertures 167, an aperture 181*a*, and/or an aperture 181*b*. The apertures 181*a* and 181*b* can be concentrically aligned. Exemplary locations and diameter distances of apertures 167 and apertures 181*a*, 181*b* are provided in Table 2.

In one implementation, the tuner 103 is manufactured as a cut-out from a sheet of metal having a thickness of or within 0.017-0.023 inches. In one implementation, the tuner 103 is formed such that the arm 173 and the base 177 are folded towards a front face of the body 175 at an angle at or within 89-91 degrees. Furthermore, the face plate 171 can be folded away from the front face of body 175 at an angle at or within 89-91 degrees such that the face plate 171 is planarly parallel to the body 175. In an exemplary implementation, the arm 173 and the base 177 have a fold radius at or within 0.01-0.03 inches respective to body 175. Furthermore, the face plate 171 has a fold radius at or within 0.01-0.03 inches respective to the arm 173.

In the assembled antenna assembly 200, one radiating element 101 is paired with one tuner 103 to form each multi-band radiator portion 100. The multi-band radiator portion 100 can be configured such that the tuner 103 is a predetermined distance from the front of the radiating element 101 (e.g., the tuner 103 can be positioned between arms 127) and wherein the face plate 171 is oriented to face towards the front face of the body portion 125 of the radiating element 101. In some implementations, the face plate 171 is planarly parallel to the body portion 125.

As shown in FIGS. 4A and 4B, in the illustrated example, the multi-band radiator portions 100 can be positioned about the base 204 offset from each other. For example, each multi-band radiator portion 100 can be approximately 90-degrees offset from adjacent multi-band radiator portion 100 about the circular base 204. In this arrangement, each multi-band radiator portion 100 faces another multi-band radiator portion 100 (e.g., multi-band radiator portion 100A faces multi-band radiator portion 100C and multi-band radiator portion 100B faces multi-band radiator portion 100D). The various tuners 103 of the multi-band radiator portions 100 can be connected to a tuner connection of a radio transceiver and/or receiver, and radiating element 101 can be connected to an antenna connection of a radio transceiver and/or receiver.

The particular implementations disclosed above are illustrative only, as the application may be modified and practiced in different but equivalent manners apparent to those skilled in the art having the benefit of the teachings herein. It is therefore evident that the particular implementations disclosed above may be altered or modified, and all such variations are considered within the scope and spirit of the application. Accordingly, the protection sought herein is as set forth in the description. It is apparent that an application with significant advantages has been described and illustrated. Although the present application is shown in a limited number of forms, it is not limited to just these forms, but is amenable to various changes and modifications without departing from the spirit thereof.

EXAMPLE CLAUSES

Various examples of systems relating to an antenna system are found in the following clauses:

Clause 1. An antenna assembly comprising: a cover; a base configured to be removably coupled to the cover; a UHF radiator portion; a VHF radiator portion; one or more multi-band radiator portions; and one or more dual-band WiFi radiator portions, wherein the UHF radiator portion, the VHF radiator portion, the one or more multi-band radiator portions, and the one or more dual-band WiFi radiator portions are positioned between the cover and the base.

Clause 2. The antenna assembly of Clause 1, wherein the UHF radiator portion comprises a first dipole arm and a second dipole arm.

Clause 3. The antenna assembly of Clause 2, wherein the first dipole arm comprises: a first base portion comprising a first end and a second end; a first arm portion extending from the first end of the first base portion; a second arm portion extending from the second end of the first base portion; and a switchback portion extending between the first arm portion and the second arm portion.

Clause 4. The antenna assembly of Clause 3, wherein the first arm portion extends at a first angle from the first base portion and the second arm portion extends at the first angle from the first base portion.

Clause 5. The antenna assembly of Clause 2-4, wherein the second dipole arm comprises: a second base portion comprising a first end and a second end; a third arm portion extending from the first end of the second base portion; a fourth arm portion extending from the second end of the second base portion; and a second switchback portion extending between the third arm portion and the fourth arm portion.

Clause 6. The antenna assembly of Clause 5, wherein the third arm portion extends at the first angle from the second base portion and the fourth arm portion extends at the first angle from the second base portion.

Clause 7. The antenna assembly of Clause 5 or Clause 6, wherein the first base portion comprises a first dipole feed portion and the second base portion comprises a second dipole feed portion.

Clause 8. The antenna assembly of any of Clauses 1-7, wherein the VHF radiator portion comprises: a first loop portion comprising: a first VHF feed portion; and a first plurality of switchbacks; and a second loop portion comprising: a second VHF feed portion; and a second plurality of switchbacks.

Clause 9. The antenna assembly of Clauses 8, further comprising: a first vertical feed portion comprising a first end and a second end; and a second vertical feed portion comprising a third end and a fourth end; wherein the first vertical feed portion is coupled to the first dipole feed portion at the first end and the first VHF feed portion at the second end, wherein the second vertical feed portion is coupled to the second dipole feed portion at the third end and the second VHF feed portion at the fourth end.

Clause 10. The antenna assembly of any of Clauses 1-9, wherein the UHF radiator portion is formed on a first PCB portion and the VHF radiator portion is formed on a second PCB portion.

Clause 11. The antenna assembly of any of Clauses 1-10, wherein the first PCB portion and the second PCB portion are flex circuits.

Clause 12. The antenna assembly of any of Clauses 1-11, wherein the cover includes a first plurality of ribs and a second plurality of ribs, the first plurality of ribs and the second plurality of ribs extending inwardly from an interior side of the cover.

Clause 13. The antenna assembly of Clause 12, wherein the first PCB portion includes a first plurality of slots and the second PCB portion includes a second plurality of slots, wherein the first plurality of ribs are configured to extend through the first plurality of slots such that the cover supports the first PCB portion and the second plurality of ribs are configured to extend through the second plurality of slots such that the cover supports the second PCB portion.

Clause 14. The antenna assembly of Clause 11, wherein the cover includes one or more attachments features configure to support the first PCB portion and the second PCB portion.

Clause 15. The antenna assembly of any of Clauses 1-13, wherein each multi-band radiator portion of the one or more multi-band radiator portions comprises: a feeding portion; a grounding portion; an upright low band radiation portion; a second low band radiation portion; and a high band radiation portion.

Clause 16. The antenna assembly of any of Clauses 15, wherein the second low band radiation portion is not-coplanar with the upright low band radiation portion.

Clause 17. The antenna assembly of any of Clauses 15, wherein the second low band radiation portion is coplanar with the upright low band radiation portion.

Clause 18. The antenna assembly of any of Clauses 15-17, wherein the high band radiation portion comprises two arms coupled to a base of the upright low band radiation portion.

Clause 19. The antenna assembly of any of Clauses 15-17, wherein the high band radiation portion comprises a single arm coupled to a base of the upright low band radiation portion.

Clause 20. The antenna assembly of any of Clauses 15-17, wherein the high band radiation portion comprises a plurality of arms coupled to a base of the upright low band radiation portion.

Clause 21. The antenna assembly of any of Clauses 15-17, wherein the high band radiation portion comprises a plurality of arms of different lengths coupled to a base of the upright low band radiation portion.

Clause 22. The antenna assembly of any of Clauses 15-21, wherein each multi-band radiator portion of the one or more multi-band radiator portions further comprises: a third low band radiation portion coupled to the second low band radiation portion; and a fourth low band radiation portion coupled to the second low band radiation portion and not contacting the third low band radiation portion.

Clause 23. The antenna assembly of Clause 22, wherein the third low band radiation portion has a first dimension, wherein the fourth low band radiation portion has a second dimension, and wherein the first dimension and the second dimension are substantially the same.

Clause 24. The antenna assembly of Clause 22, wherein the third low band radiation portion has a first dimension, wherein the fourth low band radiation portion has a second dimension, and wherein the first dimension and the second dimension are different.

Clause 25. The antenna assembly of any of Clauses 1-24, wherein the one or more multi-band radiator portions comprises four multi-band radiator portions.

Clause 26. The antenna assembly of any of Clauses 1-25, wherein the one or more dual-band WiFi radiator portions comprises two dual-band WiFi radiator portions.

Clause 27. The antenna assembly of any of Clauses 1-26, further comprising a GPS radiator portion positioned between the cover and the base.

Clause 28. The antenna assembly of any of Clauses 1-27, further comprising a Bluetooth radiator portion positioned between the cover and the base.

Clause 29. The antenna assembly of any of Clauses 1-28, further comprising a loop antenna portion configured for AM and FM radiofrequency signals.

Clause 30. The antenna assembly of Clause 29, wherein the loop antenna portion is positioned above the one or more multi-band radiator portions and the one or more dual-band WiFi radiator portions and below the VHF radiator portion and the UHF radiator portion.

Clause 31. An antenna assembly comprising: a cover; a base configured to be removably coupled to the cover; a UHF radiator portion coupled to the cover such that the UHF radiator portion is supported by the cover; and a VHF radiator portion coupled to the cover such that the VHF radiator portion is supported by the cover; wherein the UHF radiator portion and the VHF radiator portion are positioned between the cover and the base.

Clause 32. The antenna assembly of any of Clause 31, further comprising one or more multi-band radiator portions coupled to the base and positioned between the cover and the base.

Clause 33. The antenna assembly of Clause 31 or Clause 32, further comprising one or more dual-band WiFi radiator portions coupled to the base and positioned between the cover and the base.

Clause 34. The antenna assembly of any of Clauses 1-33, wherein the base comprises raised protrusions configured and adapted to support one or more cables extending from one or more central openings in the base and extending toward the one or more multi-band radiator portions and/or the one or more dual-band WiFi radiator portions positioned proximate a periphery defined along an intersection between the cover and the base.

Clause 35. The antenna assembly of any of Clauses 1-34, wherein the UHF radiator portion comprises a two arm dipole that is bent and has serpentine arms.

Clause 36. The antenna assembly of any of Clauses 1-35, wherein the VHF radiator portion comprises an angled dipole that is bent and has serpentine arms.

Clause 37. The antenna assembly of any of Clauses 1-36, further comprising a balun transformer positioned generally vertically and coupled to the UHF radiator portion, the VHF radiator portion, and/or an FM loop antenna, wherein the balun transformer is configured as a 75 ohm to 300 ohm adapter.

Clause 38. The antenna assembly of any of Clauses 1-37, further comprising a loop antenna portion configured for AM and FM radiofrequency signals, wherein the loop antenna portion is positioned above the one or more multi-band radiator portions, above the one or more dual-band WiFi radiator portions, above a GPS radiator portion, above a Bluetooth radiator portion, below the VHF radiator portion, and below the UHF radiator portion.

Clause 39. An antenna assembly comprising: a cover; a base configured to be removably coupled to the cover, wherein the cover and base when coupled define an internal compact volume of less than about 1200 cubic inches; a UHF radiator portion; and a VHF radiator portion; wherein the UHF radiator portion and the VHF radiator portion are positioned within the internal compact volume between the cover and the base.

Clause 40. The antenna assembly of any of Clauses 1-39, wherein the internal compact volume between the cover and the base is between about 200 cubic inches and between about 1200 cubic inches.

Clause 41. The antenna assembly of any of Clauses 1-40, wherein the internal compact volume between the cover and the base is between about 300 cubic inches and between about 1000 cubic inches.

Clause 42. The antenna assembly of any of Clauses 1-41, wherein the internal compact volume between the cover and the base is between about 400 cubic inches and between about 900 cubic inches.

Clause 43. The antenna assembly of any of Clauses 1-42, wherein the internal compact volume between the cover and the base is between about 500 cubic inches and between about 800 cubic inches.

Clause 44. The antenna assembly of any of Clauses 1-43, wherein the internal compact volume between the cover and the base is between about 600 cubic inches and between about 700 cubic inches.

Clause 45. The antenna assembly of any of Clauses 1-44, wherein the internal compact volume between the cover and the base is between about 650 cubic inches and between about 680 cubic inches.

Clause 46. The antenna assembly of any of Clauses 1-45, further comprising one or more multi-band radiator portions positioned within the internal compact volume between the cover and the base.

Clause 47. The antenna assembly of any of Clauses 1-46, further comprising one or more dual-band WiFi radiator portions positioned within the internal compact volume between the cover and the base.

Clause 48. The antenna assembly of any of Clauses 1-47, further comprising a loop antenna portion configured for AM and FM radiofrequency signals, wherein the loop antenna portion is positioned within the internal compact volume between the cover and the base.

Clause 49. The antenna assembly of any of Clauses 1-48, further comprising a GPS radiator portion positioned within the internal compact volume between the cover and the base.

Clause 50. The antenna assembly of any of Clauses 1-49, further comprising a Bluetooth radiator portion positioned within the internal compact volume between the cover and the base.

Clause 51. The antenna assembly of any of Clauses 1-50, wherein the loop antenna portion configured for AM and FM radiofrequency signals is positioned above four of the one or more multi-band radiator portions, above two of the one or more dual-band WiFi radiator portions, above a GPS radiator portion, above a Bluetooth radiator portion, below the VHF radiator portion, and below the UHF radiator portion.

ADDITIONAL CONSIDERATIONS AND TERMINOLOGY

Features, materials, characteristics, or groups described in conjunction with a particular aspect, implementation, or example are to be understood to be applicable to any other aspect, implementation or example described herein unless incompatible therewith. All of the features disclosed in this specification (including any accompanying claims, abstract and drawings), or all of the steps of any method or process so disclosed, may be combined in any combination, except combinations where at least some of such features or steps are mutually exclusive. The protection is not restricted to the details of any foregoing implementations. The protection extends to any novel one, or any novel combination, of the features disclosed in this specification (including any accompanying claims, abstract and drawings), or to any novel one, or any novel combination, of the steps of any method or process so disclosed.

While certain implementations have been described, these implementations have been presented by way of example only, and are not intended to limit the scope of protection. Indeed, the novel methods and systems described herein may be embodied in a variety of other forms. Furthermore, various omissions, substitutions and changes in the form of the methods and systems described herein may be made. Those skilled in the art will appreciate that in some implementations, the actual steps taken in the processes illustrated or disclosed may differ from those shown in the figures. Depending on the implementation, certain of the steps described above may be removed, others may be added. For example, the actual steps or order of steps taken in the disclosed processes may differ from those shown in the figure. Depending on the implementation, certain of the steps described above may be removed, others may be added. Furthermore, the features and attributes of the specific implementations disclosed above may be combined in different ways to form additional implementations, all of which fall within the scope of the present disclosure.

Although the present disclosure includes certain implementations, examples and applications, it will be understood by those skilled in the art that the present disclosure extends beyond the specifically disclosed implementations to other alternative implementations or uses and obvious modifications and equivalents thereof, including implementations which do not provide all of the features and advantages set forth herein. Accordingly, the scope of the present disclosure is not intended to be limited by the described implementations, and may be defined by claims as presented herein or as presented in the future.

Conditional language, such as "can," "could," "might," or "may," unless specifically stated otherwise, or otherwise understood within the context as used, is generally intended to convey that certain implementations include, while other implementations do not include, certain features, elements, or steps. Thus, such conditional language is not generally intended to imply that features, elements, or steps are in any way required for one or more implementations or that one or more implementations necessarily include logic for deciding, with or without user input or prompting, whether these features, elements, or steps are included or are to be performed in any particular implementation. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list. Likewise the term "and/or" in reference to a list of two or more items, covers all of the following interpretations of the word: any one of the items in the list, all of the items in the list, and any combination of the items in the list. Further, the term "each," as used herein, in addition to having its ordinary meaning, can mean any subset of a set of elements to which the term "each" is applied. Additionally, the words "herein," "above," "below," and words of similar import, when used in this application, refer to this application as a whole and not to any particular portions of this application.

Conjunctive language such as the phrase "at least one of X, Y, and Z," unless specifically stated otherwise, is otherwise understood with the context as used in general to convey that an item, term, etc. may be either X, Y, or Z. Thus, such conjunctive language is not generally intended to imply that certain implementations require the presence of at least one of X, at least one of Y, and at least one of Z.

Language of degree used herein, such as the terms "approximately," "about," "generally," and "substantially" as used herein represent a value, amount, or characteristic close to the stated value, amount, or characteristic that still performs a desired function or achieves a desired result. For example, the terms "approximately", "about", "generally," and "substantially" may refer to an amount that is within less than 10% of, within less than 5% of, within less than 1% of, within less than 0.1% of, and within less than 0.01% of the stated amount. As another example, in certain implementations, the terms "generally parallel" and "substantially parallel" refer to a value, amount, or characteristic that departs from exactly parallel by less than or equal to 15 degrees, 10 degrees, 5 degrees, 3 degrees, 1 degree, or 0.1 degree.

What is claimed is:

1. An antenna assembly comprising:
a cover;
a base configured to be removably coupled to the cover;
a UHF radiator portion comprising:
a first dipole arm comprises:
a first base portion comprising a first end and a second end;
a first arm portion extending from the first end of the first base portion;
a second arm portion extending from the second end of the first base portion; and
a switchback portion extending between the first arm portion and the second arm portion; and
a second dipole arm comprises:
a second base portion comprising a first end and a second end;
a third arm portion extending from the first end of the second base portion;
a fourth arm portion extending from the second end of the second base portion; and
a second switchback portion extending between the third arm portion and the fourth arm portion;
a VHF radiator portion;
one or more multi-band radiator portions; and
one or more dual-band WiFi radiator portions,
wherein the UHF radiator portion, the VHF radiator portion, the one or more multi-band radiator portions, and the one or more dual-band WiFi radiator portions are positioned between the cover and the base.

2. The antenna assembly of claim 1, wherein the first arm portion extends at a first angle from the first base portion and the second arm portion extends at the first angle from the first base portion, wherein the third arm portion extends at the first angle from the second base portion and the fourth arm portion extends at the first angle from the second base portion.

3. The antenna assembly of claim 1, wherein the first base portion comprises a first dipole feed portion and the second base portion comprises a second dipole feed portion.

4. The antenna assembly of claim 3, wherein the VHF radiator portion comprises:
a first loop portion comprising:
a first VHF feed portion; and
a first plurality of switchbacks; and
a second loop portion comprising:
a second VHF feed portion; and
a second plurality of switchbacks.

5. The antenna assembly of claim 4, further comprising:
a first vertical feed portion comprising a first end and a second end; and
a second vertical feed portion comprising a third end and a fourth end;
wherein the first vertical feed portion is coupled to the first dipole feed portion at the first end and the first VHF feed portion at the second end, wherein the second vertical feed portion is coupled to the second dipole feed portion at the third end and the second VHF feed portion at the fourth end.

6. The antenna assembly of claim 1, wherein the UHF radiator portion is formed on a first PCB portion and the VHF radiator portion is formed on a second PCB portion.

7. The antenna assembly of claim 6, wherein the first PCB portion and the second PCB portion are flex circuits.

8. The antenna assembly of claim 7, wherein the cover includes one or more attachments features configure to support the first PCB portion and the second PCB portion.

9. An antenna assembly comprising:
a cover;
a base configured to be removably coupled to the cover;
a UHF radiator portion;
a VHF radiator portion;
a loop antenna portion configured for AM and FM radiofrequency signals;
one or more multi-band radiator portions; and
one or more dual-band WiFi radiator portions,
wherein the UHF radiator portion, the VHF radiator portion, the one or more multi-band radiator portions, and the one or more dual-band WiFi radiator portions are positioned between the cover and the base,
wherein the loop antenna portion is positioned above the one or more multi-band radiator portions and the one or more dual-band WiFi radiator portions and below the VHF radiator portion and the UHF radiator portion.

10. The antenna assembly of claim 9 wherein the UHF radiator portion is formed on a first PCB portion and the VHF radiator portion is formed on a second PCB portion.

11. The antenna assembly of claim 10, wherein the first PCB portion and the second PCB portion are flex circuits.

12. The antenna assembly of claim 9, wherein the cover includes one or more attachments features configure to supporting at least one of the UHF radiator portion or the VHF radiator portion.

13. An antenna assembly comprising:

a cover;

a base configured to be removably coupled to the cover;

a UHF radiator portion coupled to the cover such that the UHF radiator portion is supported by the cover; and a VHF radiator portion coupled to the cover such that the VHF radiator portion is supported by the cover;

wherein the UHF radiator portion and the VHF radiator portion are positioned between the cover and the base.

14. The antenna assembly of claim 13, further comprising one or more multi-band radiator portions coupled to the base and positioned between the cover and the base.

15. The antenna assembly of claim 14, further comprising one or more dual-band WiFi radiator portions coupled to the base and positioned between the cover and the base.

16. The antenna assembly of claim 15, wherein the base comprises raised protrusions configured and adapted to support one or more cables extending from one or more central openings in the base and extending toward the one or more multi-band radiator portions and/or the one or more dual-band WiFi radiator portions positioned proximate a periphery defined along an intersection between the cover and the base.

17. The antenna assembly of claim 15, further comprising a loop antenna portion configured for AM and FM radiofrequency signals, wherein the loop antenna portion is positioned above the one or more multi-band radiator portions, above the one or more dual-band WiFi radiator portions, above a GPS radiator portion, above a Bluetooth radiator portion, below the VHF radiator portion, and below the UHF radiator portion.

18. The antenna assembly of claim 13, wherein the UHF radiator portion comprises a two arm dipole that is bent and has serpentine arms.

19. The antenna assembly of claim 13, wherein the VHF radiator portion comprises an angled dipole that is bent and has serpentine arms.

20. The antenna assembly of claim 13, further comprising a balun transformer positioned generally vertically and coupled to the UHF radiator portion, the VHF radiator portion, and/or an FM loop antenna.

* * * * *